(12) United States Patent
Danilov et al.

(10) Patent No.: US 11,029,865 B2
(45) Date of Patent: Jun. 8, 2021

(54) AFFINITY SENSITIVE STORAGE OF DATA CORRESPONDING TO A MAPPED REDUNDANT ARRAY OF INDEPENDENT NODES

(71) Applicant: EMC IP Holding Company LLC, Hopkinton, MA (US)

(72) Inventors: Mikhail Danilov, Saint Petersburg (RU); Konstantin Buinov, Prague (CZ)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 2 days.

(21) Appl. No.: 16/374,725

(22) Filed: Apr. 3, 2019

(65) Prior Publication Data

US 2020/0319807 A1    Oct. 8, 2020

(51) Int. Cl.
*G06F 3/06* (2006.01)
*G06F 12/10* (2016.01)

(52) U.S. Cl.
CPC .......... *G06F 3/0631* (2013.01); *G06F 3/0604* (2013.01); *G06F 3/0653* (2013.01); *G06F 3/0689* (2013.01); *G06F 12/10* (2013.01); *G06F 2212/657* (2013.01)

(58) Field of Classification Search
CPC .... G06F 3/0631; G06F 3/0604; G06F 3/0653; G06F 3/0689; G06F 12/10; G06F 2212/657
See application file for complete search history.

(56) References Cited

U.S. PATENT DOCUMENTS

| | | | |
|---|---|---|---|
| 5,675,802 | A | 10/1997 | Allen et al. |
| 5,805,788 | A | 9/1998 | Johnson |
| 5,950,225 | A | 9/1999 | Kleiman |
| 6,502,243 | B1 | 12/2002 | Thomas |
| 7,389,393 | B1 | 6/2008 | Karr et al. |
| 7,577,091 | B2 | 8/2009 | Antal et al. |
| 7,631,051 | B1 | 12/2009 | Fein et al. |

(Continued)

OTHER PUBLICATIONS

Non-Final Office Action received for U.S. Appl. No. 16/209,185 dated Jun. 18, 2020, 22 pages.

(Continued)

*Primary Examiner* — Nanci N Wong
(74) *Attorney, Agent, or Firm* — Amin, Turocy & Watson, LLP

(57) ABSTRACT

Affinity sensitive storage of data corresponding to a mapped redundant array of independent nodes, e.g., mapped cluster, in a real storage system, e.g., a real cluster, is disclosed. Different mappings of mapped cluster data to real cluster storage locations can result in different levels of affinity between real nodes of the real cluster. A data storage scheme can be selected based on affinity scores, for example drawn from an affinity matrix, to provide access to stored data that can be more resilient against a real node becoming less available. Further, data recovery from a real node that has become less accessible can be improved where data is stored based on the affinity scores. Generally, data storage that provides greater diversity of data storage locations can be related to more desirable affinity scores. Further, data storage that provides less divergence of affinity scores across an affinity matrix can also be desirable.

20 Claims, 10 Drawing Sheets

(56) References Cited

U.S. PATENT DOCUMENTS

| | | |
|---|---|---|
| 7,664,839 B1 | 2/2010 | Karr et al. |
| 7,680,875 B1 | 3/2010 | Shopiro et al. |
| 7,721,044 B1 | 5/2010 | Chatterjee et al. |
| 8,125,406 B1 | 2/2012 | Jensen et al. |
| 8,261,033 B1 | 9/2012 | Slik et al. |
| 8,370,542 B2 | 2/2013 | Lu et al. |
| 8,479,037 B1 | 7/2013 | Chatterjee et al. |
| 8,495,465 B1 | 7/2013 | Anholt et al. |
| 8,540,625 B2 | 9/2013 | Miyoshi |
| 8,751,599 B2 | 6/2014 | Tran et al. |
| 8,751,740 B1 | 6/2014 | De Forest et al. |
| 8,799,746 B2 | 8/2014 | Baker et al. |
| 8,832,234 B1 | 9/2014 | Brooker et al. |
| 8,856,619 B1 | 10/2014 | Cypher |
| 8,856,624 B1 | 10/2014 | Paniconi |
| 8,972,478 B1 | 3/2015 | Storer et al. |
| 9,003,086 B1 | 4/2015 | Schuller et al. |
| 9,021,296 B1 | 4/2015 | Kiselev et al. |
| 9,037,825 B1 | 5/2015 | Donlan et al. |
| 9,052,942 B1 | 6/2015 | Barber et al. |
| 9,063,838 B1 | 6/2015 | Boyle et al. |
| 9,098,447 B1 | 8/2015 | Donlan et al. |
| 9,208,009 B2 | 12/2015 | Resch et al. |
| 9,218,135 B2 | 12/2015 | Miller et al. |
| 9,244,761 B2 | 1/2016 | Yekhanin et al. |
| 9,268,783 B1 | 2/2016 | Shilane et al. |
| 9,274,903 B1 | 3/2016 | Garlapati et al. |
| 9,280,430 B2 | 3/2016 | Saifare et al. |
| 9,405,483 B1 | 8/2016 | Wei et al. |
| 9,477,682 B1 | 10/2016 | Bent et al. |
| 9,495,241 B2 | 11/2016 | Flynn et al. |
| 9,619,256 B1 | 4/2017 | Natanzon et al. |
| 9,641,615 B1 | 5/2017 | Robins et al. |
| 9,665,428 B2 | 5/2017 | Vairavanathan et al. |
| 9,747,057 B1 | 8/2017 | Ramani et al. |
| 9,817,713 B2 | 11/2017 | Gupta et al. |
| 9,864,527 B1 | 1/2018 | Srivastav et al. |
| 9,942,084 B1 | 4/2018 | Sorenson, III |
| 10,001,947 B1 | 6/2018 | Chatterjee et al. |
| 10,007,561 B1 | 6/2018 | Pudipeddi et al. |
| 10,055,145 B1 | 8/2018 | Danilov et al. |
| 10,061,668 B1 | 8/2018 | Lazier et al. |
| 10,127,234 B1 | 11/2018 | Krishnan et al. |
| 10,216,770 B1 | 2/2019 | Kulesza et al. |
| 10,242,022 B1 | 3/2019 | Jain et al. |
| 10,282,262 B2 | 5/2019 | Panara et al. |
| 10,289,488 B1 | 5/2019 | Danilov et al. |
| 10,331,516 B2 | 6/2019 | Danilov et al. |
| 10,361,810 B2 | 7/2019 | Myung et al. |
| 10,496,330 B1 | 12/2019 | Bemat et al. |
| 10,503,611 B1 | 12/2019 | Srivastav et al. |
| 10,567,009 B2 | 2/2020 | Yang et al. |
| 10,579,490 B2 | 3/2020 | Danilov et al. |
| 10,613,780 B1 | 4/2020 | Naeni et al. |
| 10,733,053 B1 | 8/2020 | Miller et al. |
| 10,797,863 B2 | 10/2020 | Chen et al. |
| 2002/0166026 A1 | 11/2002 | Ulrich et al. |
| 2002/0191311 A1 | 12/2002 | Ulrich et al. |
| 2005/0080982 A1 | 4/2005 | Vasilevsky et al. |
| 2005/0088318 A1 | 4/2005 | Liu et al. |
| 2005/0108775 A1 | 5/2005 | Bachar et al. |
| 2005/0140529 A1 | 6/2005 | Choi et al. |
| 2005/0234941 A1 | 10/2005 | Watanabe |
| 2006/0047896 A1 | 3/2006 | Nguyen et al. |
| 2006/0075007 A1 | 4/2006 | Anderson et al. |
| 2006/0143508 A1 | 6/2006 | Mochizuki et al. |
| 2006/0265211 A1 | 11/2006 | Canniff et al. |
| 2007/0076321 A1 | 4/2007 | Takahashi et al. |
| 2007/0239759 A1 | 10/2007 | Shen et al. |
| 2007/0250674 A1 | 10/2007 | Findberg et al. |
| 2008/0222480 A1 | 9/2008 | Huang et al. |
| 2008/0222481 A1 | 9/2008 | Huang et al. |
| 2008/0244353 A1 | 10/2008 | Dholakia et al. |
| 2008/0320061 A1 | 12/2008 | Aszmann et al. |
| 2009/0070771 A1* | 3/2009 | Yuyitung ............... G06Q 10/06 718/105 |
| 2009/0113034 A1 | 4/2009 | Krishnappa et al. |
| 2009/0172464 A1 | 7/2009 | Byrne et al. |
| 2009/0183056 A1 | 7/2009 | Aston |
| 2009/0204959 A1* | 8/2009 | Anand .................. G06F 9/5027 718/1 |
| 2009/0240880 A1 | 9/2009 | Kawaguchi |
| 2009/0259882 A1 | 10/2009 | Shellhamer |
| 2010/0031060 A1 | 2/2010 | Chew et al. |
| 2010/0094963 A1 | 4/2010 | Zuckerman et al. |
| 2010/0218037 A1 | 8/2010 | Swartz et al. |
| 2010/0293348 A1 | 11/2010 | Ye et al. |
| 2010/0332748 A1 | 12/2010 | Van der Goot et al. |
| 2011/0029836 A1 | 2/2011 | Dhuse et al. |
| 2011/0106972 A1 | 5/2011 | Grube et al. |
| 2011/0107165 A1 | 5/2011 | Resch et al. |
| 2011/0138148 A1 | 6/2011 | Friedman et al. |
| 2011/0161712 A1 | 6/2011 | Athalye et al. |
| 2011/0196833 A1 | 8/2011 | Drobychev et al. |
| 2011/0246503 A1 | 10/2011 | Bender et al. |
| 2011/0292054 A1 | 12/2011 | Boker et al. |
| 2012/0023291 A1 | 1/2012 | Zeng et al. |
| 2012/0096214 A1 | 4/2012 | Lu et al. |
| 2012/0191675 A1 | 7/2012 | Kim et al. |
| 2012/0191901 A1 | 7/2012 | Norair |
| 2012/0204077 A1 | 8/2012 | D'Abreu et al. |
| 2012/0233117 A1 | 9/2012 | Holt et al. |
| 2012/0311395 A1 | 12/2012 | Leggette et al. |
| 2012/0317234 A1 | 12/2012 | Bohrer et al. |
| 2012/0321052 A1 | 12/2012 | Morrill et al. |
| 2013/0047187 A1 | 2/2013 | Frazier et al. |
| 2013/0054822 A1 | 2/2013 | Mordani et al. |
| 2013/0067159 A1* | 3/2013 | Mehra ................... G06F 3/0619 711/114 |
| 2013/0067187 A1* | 3/2013 | Moss ..................... G06F 3/0665 711/170 |
| 2013/0088501 A1 | 4/2013 | Fell |
| 2013/0097470 A1 | 4/2013 | Hwang et al. |
| 2013/0145208 A1 | 6/2013 | Yen et al. |
| 2013/0238932 A1 | 9/2013 | Resch |
| 2013/0246876 A1 | 9/2013 | Manssour et al. |
| 2013/0290482 A1 | 10/2013 | Leggette |
| 2013/0305365 A1 | 11/2013 | Rubin et al. |
| 2014/0040417 A1 | 2/2014 | Galdwin et al. |
| 2014/0064048 A1 | 3/2014 | Cohen et al. |
| 2014/0115182 A1 | 4/2014 | Sabaa et al. |
| 2014/0164430 A1 | 6/2014 | Hadjieleftheriou et al. |
| 2014/0164694 A1 | 6/2014 | Storer |
| 2014/0250450 A1 | 9/2014 | Yu et al. |
| 2014/0280375 A1 | 9/2014 | Rawson et al. |
| 2014/0281804 A1 | 9/2014 | Resch |
| 2014/0297955 A1 | 10/2014 | Yamazaki et al. |
| 2014/0331100 A1 | 11/2014 | Dhuse et al. |
| 2014/0358972 A1* | 12/2014 | Guarrieri ............. G06F 21/6227 707/781 |
| 2014/0359244 A1* | 12/2014 | Chambliss ............. G06F 3/0604 711/170 |
| 2014/0380088 A1 | 12/2014 | Bennett et al. |
| 2014/0380125 A1 | 12/2014 | Calder et al. |
| 2015/0006846 A1 | 1/2015 | Youngworth |
| 2015/0074065 A1 | 3/2015 | Christ et al. |
| 2015/0112951 A1 | 4/2015 | Narayanamurthy et al. |
| 2015/0134626 A1 | 5/2015 | Theimer et al. |
| 2015/0142863 A1 | 5/2015 | Yuen et al. |
| 2015/0178007 A1 | 6/2015 | Moisa et al. |
| 2015/0186043 A1 | 7/2015 | Kesselman et al. |
| 2015/0269025 A1 | 9/2015 | Krishnamurthy et al. |
| 2015/0303949 A1 | 10/2015 | Jafarkhani et al. |
| 2015/0331766 A1 | 11/2015 | Saifare et al. |
| 2015/0370656 A1 | 12/2015 | Tsafrir et al. |
| 2016/0011935 A1 | 1/2016 | Luby |
| 2016/0011936 A1 | 1/2016 | Luby |
| 2016/0055054 A1 | 2/2016 | Patterson, III et al. |
| 2016/0162378 A1 | 6/2016 | Garlapati et al. |
| 2016/0169692 A1 | 6/2016 | Gupta |
| 2016/0170668 A1 | 6/2016 | Mehra |
| 2016/0217104 A1 | 7/2016 | Kamble et al. |
| 2016/0232055 A1 | 8/2016 | Vairavanathan et al. |

(56) References Cited

U.S. PATENT DOCUMENTS

| | | |
|---|---|---|
| 2016/0253400 A1 | 9/2016 | McAlister et al. |
| 2016/0277497 A1 | 9/2016 | Bannister et al. |
| 2016/0292429 A1 | 9/2016 | Bannister et al. |
| 2016/0294419 A1 | 10/2016 | Sandell et al. |
| 2016/0328295 A1 | 11/2016 | Baptist et al. |
| 2016/0357649 A1 | 12/2016 | Karrotu et al. |
| 2016/0371145 A1 | 12/2016 | Akutsu et al. |
| 2016/0378624 A1 | 12/2016 | Jenkins, Jr. et al. |
| 2016/0380650 A1 | 12/2016 | Calder et al. |
| 2017/0003880 A1 | 1/2017 | Fisher et al. |
| 2017/0004044 A1 | 1/2017 | Tormasov et al. |
| 2017/0017671 A1 | 1/2017 | Baptist et al. |
| 2017/0031945 A1 | 2/2017 | Sarab et al. |
| 2017/0097875 A1 | 4/2017 | Jess et al. |
| 2017/0102993 A1 | 4/2017 | Hu et al. |
| 2017/0116088 A1 | 4/2017 | Anami et al. |
| 2017/0187398 A1 | 6/2017 | Trusov |
| 2017/0187766 A1 | 6/2017 | Zheng et al. |
| 2017/0206025 A1 | 7/2017 | Viswanathan |
| 2017/0206135 A1 | 7/2017 | Zeng |
| 2017/0212680 A1 | 7/2017 | Waghulde |
| 2017/0212845 A1* | 7/2017 | Conway ............. G06F 12/122 |
| 2017/0235507 A1 | 8/2017 | Sinha et al. |
| 2017/0262187 A1 | 9/2017 | Manzanares et al. |
| 2017/0268900 A1 | 9/2017 | Nicolaas et al. |
| 2017/0285952 A1 | 10/2017 | Danilov et al. |
| 2017/0286009 A1 | 10/2017 | Danilov et al. |
| 2017/0286436 A1 | 10/2017 | Neporada et al. |
| 2017/0286516 A1 | 10/2017 | Horowitz et al. |
| 2017/0288701 A1 | 10/2017 | Slik et al. |
| 2017/0344285 A1 | 11/2017 | Choi et al. |
| 2018/0052744 A1 | 2/2018 | Chen et al. |
| 2018/0063213 A1 | 3/2018 | Bevilacqua-Linn et al. |
| 2018/0074881 A1 | 3/2018 | Burden |
| 2018/0121286 A1 | 5/2018 | Sipos |
| 2018/0129417 A1 | 5/2018 | Sivasubramanian et al. |
| 2018/0181324 A1 | 6/2018 | Danilov et al. |
| 2018/0181475 A1 | 6/2018 | Danilov et al. |
| 2018/0181612 A1 | 6/2018 | Danilov et al. |
| 2018/0246668 A1* | 8/2018 | Sakashita ............. G06F 3/061 |
| 2018/0267856 A1 | 9/2018 | Hayasaka et al. |
| 2018/0267985 A1 | 9/2018 | Badey et al. |
| 2018/0306600 A1 | 10/2018 | Nicolaas et al. |
| 2018/0307560 A1 | 10/2018 | Vishnumolakala et al. |
| 2018/0341662 A1 | 11/2018 | He |
| 2018/0375936 A1 | 12/2018 | Chirammal et al. |
| 2019/0028179 A1 | 1/2019 | Kalhan |
| 2019/0034084 A1* | 1/2019 | Nagarajan ............. G06F 3/067 |
| 2019/0043201 A1 | 2/2019 | Strong et al. |
| 2019/0043351 A1 | 2/2019 | Yang et al. |
| 2019/0050301 A1 | 2/2019 | Juniwal et al. |
| 2019/0065092 A1 | 2/2019 | Shah et al. |
| 2019/0065310 A1 | 2/2019 | Rozas |
| 2019/0114223 A1 | 4/2019 | Pydipaty et al. |
| 2019/0205437 A1 | 7/2019 | Larson et al. |
| 2019/0215017 A1 | 7/2019 | Danilov et al. |
| 2019/0220207 A1 | 7/2019 | Lingarajappa |
| 2019/0356416 A1 | 11/2019 | Yanovsky et al. |
| 2019/0384500 A1 | 12/2019 | Danilov et al. |
| 2019/0386683 A1 | 12/2019 | Danilov et al. |
| 2020/0026810 A1 | 1/2020 | Subramaniam et al. |
| 2020/0042178 A1 | 2/2020 | Danilov et al. |
| 2020/0050510 A1 | 2/2020 | Chien et al. |
| 2020/0104377 A1 | 4/2020 | Earnesty, Jr. et al. |
| 2020/0117556 A1 | 4/2020 | Zou et al. |

OTHER PUBLICATIONS

Martin Hosken, Developing a Hyper-Converged Storage Strategy for VMware vCloud Director with VMware vSAN, Jan. 2018 (Year: 2018).

Non-Final Office Action received for U.S. Appl. No. 16/261,549 dated Apr. 15, 2020, 22 pages.

Non-Final Office Action received for U.S. Appl. No. 16/374,726 dated Jun. 2, 2020, 47 pages.

Natarajan, RAID 0, RAID 1, RAID 5, RAID 10 Explained with Diagrams, Aug. 10, 2010, thegeekstuff.com (18 pages).

Non-Final Office Action received for U.S. Appl. No. 16/177,285 dated Jul. 22, 2020, 31 pages.

Non-Final Office Action received for U.S. Appl. No. 16/261,547 dated Sep. 3, 2020, 26 pages.

Non-Final Office Action received for U.S. Appl. No. 16/261,548 dated Aug. 21, 2020, 42 pages.

Notice of Allowance received for U.S. Appl. No. 16/261,549 dated Jul. 17, 2020, 40 pages.

Qiang et al., "Dynamics Process of Long-running Allocation/Collection in Linear Storage Space", International Conference on Networking, Architecture, and Storage (NAS 2007), Guilin, 2007, pp. 209-216.

Office Action received for U.S. Appl. No. 16/254,073, dated Aug. 18, 2020, 62 pages.

Non-Final Office Action received for U.S. Appl. No. 16/511,161 dated Jul. 10, 2020, 24 pages.

Notice of Allowance received for U.S. Appl. No. 15/862,547 dated Mar. 29, 2019 27 pages.

Non-Final Office Action received for U.S. Appl. No. 15/792,714 dated Apr. 4, 2019, 20 pages.

Final Office Action received for U.S. Appl. No. 15/792,714 dated Sep. 12, 2019, 43 pages.

Wikipedia "Garbage Collection", URL: https://en.wikipedia.org/wiki/Garbage_collection_(computer science) #Availability (Year: 2017) retrieved using the WayBackMachine, Sep. 8, 2017, 8 pages.

Wikipedia "Erasure code", URL: https://web.archive.org/web/20170908171158/https://en.wikipedia.org/wiki/Erasure_code (Year: 2017), retrieved using the WayBackMachine, Sep. 8, 2017, 5 pages.

Wikipedia "Front and back ends" URL: https://en.wikipedia.org/wiki/Front_and_back_ends (Year:2019), Sep. 6, 2019, 4 pages.

Notice of Allowance received for U.S. Appl. No. 15/792,714 dated Nov. 8, 2019, 31 pages.

Non-Final Office Action received for U.S. Appl. No. 15/791,390 dated Sep. 20, 2019, 27 pages.

Final Office Action received for U.S. Appl. No. 15/791,390 dated Feb. 6, 2020, 29 pages.

Non-Final Office Action received for U.S. Appl. No. 15/791,390 dated Apr. 30, 2020, 48 pages.

Huang et al., "Scale-RS: An Efficient Scaling Scheme for RS-Coded Storage Clusters," in IEEE Transactions on Parallel and Distributed Systems, vol. 26, No. 6, pp. 1704-1717, Jun. 1, 2015.

Non-Final Office Action received for U.S. Appl. No. 16/457,615 dated Jul. 20, 2020, 34 pages.

Non-Final Office Action received for U.S. Appl. No. 15/651,504 dated Mar. 21,2019, 10 pages.

Non-Final Office Action received for U.S. Appl. No. 15/662,273 dated Nov. 16, 2018, 19 pages.

Final Office Action received for U.S. Appl. No. 15/662,273 dated May 15, 2019, 33 pages.

Non-Final Office Action received for U.S. Appl. No. 15/965,479 dated Apr. 15, 2019, 21 pages.

Non-Final Office Action received for U.S. Appl. No. 15/794,950 dated Jul. 9, 2019, 29 pages.

Final Office Action received for U.S. Appl. No. 15/651,504 dated Sep. 18, 2019, 15 pages.

Non-Final Office Action received for U.S. Appl. No. 15/952,179 dated Sep. 10, 2019, 42 pages.

Wikipedia, "Standard Raid Levels—RAID 6", URL: https://en.wikipedia.org/wiki/Standard_RAID_levels#RAID_6, Oct. 18, 2019, 11 pages.

Non-Final Office Action received for U.S. Appl. No. 15/656,382 dated Nov. 1, 2019, 47 pages.

Final Office Action received for U.S. Appl. No. 15/952,179 dated Nov. 26, 2019, 53 pages.

Non Final Office Action received for U.S. Appl. No. 16/024,314 dated Nov. 25, 2019, 42 pages.

Non- Final Office Action received for U.S. Appl. No. 16/177, 278 dated Dec. 2, 2019, 55 pages.

(56) References Cited

OTHER PUBLICATIONS

Non-Final Office Action received for U.S. Appl. No. 15/651,504 dated Dec. 31, 2019, 18 pages.
Non-Final Office Action received for U.S. Appl. No. 16/010,246 dated Dec. 5, 2019, 67 pages.
Stonebreaker et al. "Distributed RAID—a New Multiple Copy Algorithm.", IEEE ICDE, 1990, pp. 430-437.
Muralidhar et al. "f4: Facebook's Warm BLOB Storage System", USENIX. OSDI, Oct. 2014, pp. 383-398.
Final Office Action dated Feb. 12, 2020 for U.S. Appl. No. 16/024,314, 29 pages.
Non-Final Office Action received for U.S. Appl. No. 16/010,255 dated Jan. 9, 2020, 31 pages.
Office Action dated Feb. 5, 2020 for U.S. Appl. No. 16/261,551, 30 pages.
Non-Final Office Action received for U.S. Appl. No. 16/228,612 dated Feb. 27, 2020, 49 pages.
Final Office Action received for U.S. Appl. No. 16/010,246 dated Mar. 16, 2020, 33 pages.
Final Office Action received for U.S. Appl. No. 15/656,382 dated Apr. 6, 2020, 31 pages.
Non-Final Office Action received for U.S. Appl. No. 15/582,167 dated Sep. 7, 2018, 19 pages.
Non-Final Office Action received for U.S. Appl. No. 15/952,179 dated Apr. 20, 2020, 68 pages.
Notice of Allowance received for U.S. Appl. No. 16/240,193, dated May 4, 2020, 46 pages.
Final Office Action received for U.S. Appl. No. 16/177,278, dated May 11, 2020, 53 pages.
Non-Final Office Action received for U.S. Appl. No. 16/231,018 dated May 8, 2020, 78 pages.
Notice of Allowance dated May 11, 2020 for U.S. Appl. No. 16/240,193, 24 pages.
Non-Final Office Action received for U.S. Appl. No. 16/228,624 dated Jun. 24, 2020, 65 pages.
Non-Final Office Action received for U.S. Appl. No. 16/240,272 dated Jun. 29, 2020, 64 pages.
Non-Final Office Action received for U.S. Appl. No. 16/228,612 dated Jun. 29, 2020, 62 pages.
Final Office Action received for U.S. Appl. No. 16/010,255 dated Jul. 23, 2020, 36 pages.
Office Action received for U.S. Appl. No. 16/010,246 dated Jul. 27, 2020 36 pages.
Office Action received for U.S. Appl. No. 16/177,278, dated Aug. 21, 2020, 53 pages.
Office Action received for U.S. Appl. No. 16/179,486, dated Aug. 13, 2020, 64 pages.
Guo et al., "GeoScale: Providing Geo-Elasticity in Distributed Clouds" 2016 IEEE International Conference on Cloud Engineering, 4 pages.
Guo et al., "Providing Geo-Elasticity in Geographically Distributed Clouds". ACM Transactions on Internet Technology, vol. 18, No. 3, Article 38. Apr. 2018. 27 pages.
Non-Final Office Action received for U.S. Appl. No. 16/526,142 dated Oct. 15, 2020, 21 pages.
Notice of Allowance received U.S. Appl. No. 16/228,612 date Oct. 20, 2020, 84 pages.
Zhou, et al. "Fast Erasure Coding for Data Storage: A Comprehensive Study of the Acceleration Techniques" Proceedings of the 17th Usenix Conference on File and Storage Technologies (FAST '19), [https://www.usenix.org/conference/fast19/presentation/zhou], Feb. 2019, Boston, MA, USA. 14 pages.
Non-Final Office Action received for U.S. Appl. No. 16/010,255 dated Oct. 29, 2020, 65 pages.
Final Office Action received for U.S. Appl. No. 16/240,272 dated Oct. 27, 2020, 42 pages.
Non-Final Office Action received for U.S. Appl. No. 16/399,902 dated Oct. 28, 2020, 83 pages.
Notice of Allowance received for U.S. Appl. No. 16/374,726 dated Nov. 20, 2020, 78 pages.
Final Office Action received for U.S. Appl. No. 16/228,624 dated Dec. 1, 2020, 63 pages.
Non-Final Office Action received for U.S. Appl. No. 16/570,657 dated Nov. 27, 2020, 75 pages.
Final Office Action received for U.S. Appl. No. 16/177,285 dated Dec. 30, 2020, 61 pages.
Final Office Action received for U.S. Appl. No. 16/511,161 dated Dec. 30, 2020, 61 pages.
Non-Final Office Action received for U.S. Appl. No. 16/399,895 dated Jan. 4, 2021, 64 pages.
Notice of Allowance received for U.S. Appl. No. 16/374,726 dated Jan. 6, 2021, 56 pages.
Non-Final Office Action received for U.S. Appl. No. 16/399,897 dated Feb. 19, 2021, 56 pages.
Non-Final Office Action received for U.S. Appl. No. 16/670,715 dated Mar. 31, 2021, 60 pages.
Final Office Action received for U.S. Appl. No. 16/177,278 dated Feb. 24, 2021, 109 pages.
EMC; "EMC ECS (Elastic Cloud Storage) Architectural Guide v2.x;" EMC; Jun. 2015; available at: https://www.dell.com/community/s/vjauj58549/attachments/vjauj58549/solutions-ch/477 /1/h14071-ecs-architectural-guide-wp.pdf, Jun. 2015, 21 pages.
Mohan et al., "Geo-aware erasure coding for high-performance erasure-coded storage clusters", Springer Link, URL: https://link.springer.com/article/10.1007/s 12243-017-0623-2, Jan. 18, 2018.
Final Office Action received for U.S. Appl. No. 16/179,486 dated Jan. 28, 2021, 55 pages.
Non-Final Office Action received for U.S. Appl. No. 16/670,746 dated Feb. 16, 2021, 55 pages.
Dell Technologies, "ECS Overview and Architecture", h14071.18, Feb. 2021, 55 pages.
Non-Final Office Action received for U.S. Appl. No. 16/177,285 dated Apr. 9, 2021, 41 pages.
Non-Final Office Action received for U.S. Appl. No. 16/779,208 dated Apr. 20, 2021, 71 pages.

* cited by examiner

AFFINITY SENSITIVE STORAGE OF DATA CORRESPONDING TO A MAPPED REDUNDANT ARRAY OF INDEPENDENT NODES

TECHNICAL FIELD

The disclosed subject matter relates to data storage, more particularly, to mapping logical storage devices to real storage devices of at least one group of real storage devices comprising real nodes, wherein the mapping is based on a level of affinity between real nodes.

BACKGROUND

Conventional data storage techniques can store data in one or more arrays of data storage devices. As an example, data can be stored in an ECS (formerly known as ELASTIC CLOUD STORAGE) system, hereinafter ECS system, such as is provided by DELL EMC. The example ECS system can comprise data storage devices, e.g., disks, etc., arranged in nodes, wherein nodes can be comprised in an ECS cluster. One use of data storage is in bulk data storage. Data can conventionally be stored in a group of nodes format for a given cluster, for example, in a conventional ECS system, all disks of nodes comprising the group of nodes are considered part of the group. As such, a node with many disks can, in some conventional embodiments, comprise a large amount of storage that can go underutilized. As an example, a storage group of five nodes, with ten disks per node, at 8 terabytes (TBs) per disk is roughly 400 TB in size. This can be excessively large for some types of data storage, however apportioning smaller groups, e.g., fewer nodes, less disks, smaller disks, etc., can be inefficient in regards to processor and network resources, e.g., computer resource usage, to support these smaller groups. As such, it can be desirable to have more granular logical storage groups that can employ portions of larger real groups, thereby facilitating efficient computer resource usage, e.g., via larger real groups, but still providing smaller logical groups that can be used more optimally for storing smaller amounts of data therein.

DETAILED DESCRIPTION

Figure 1:
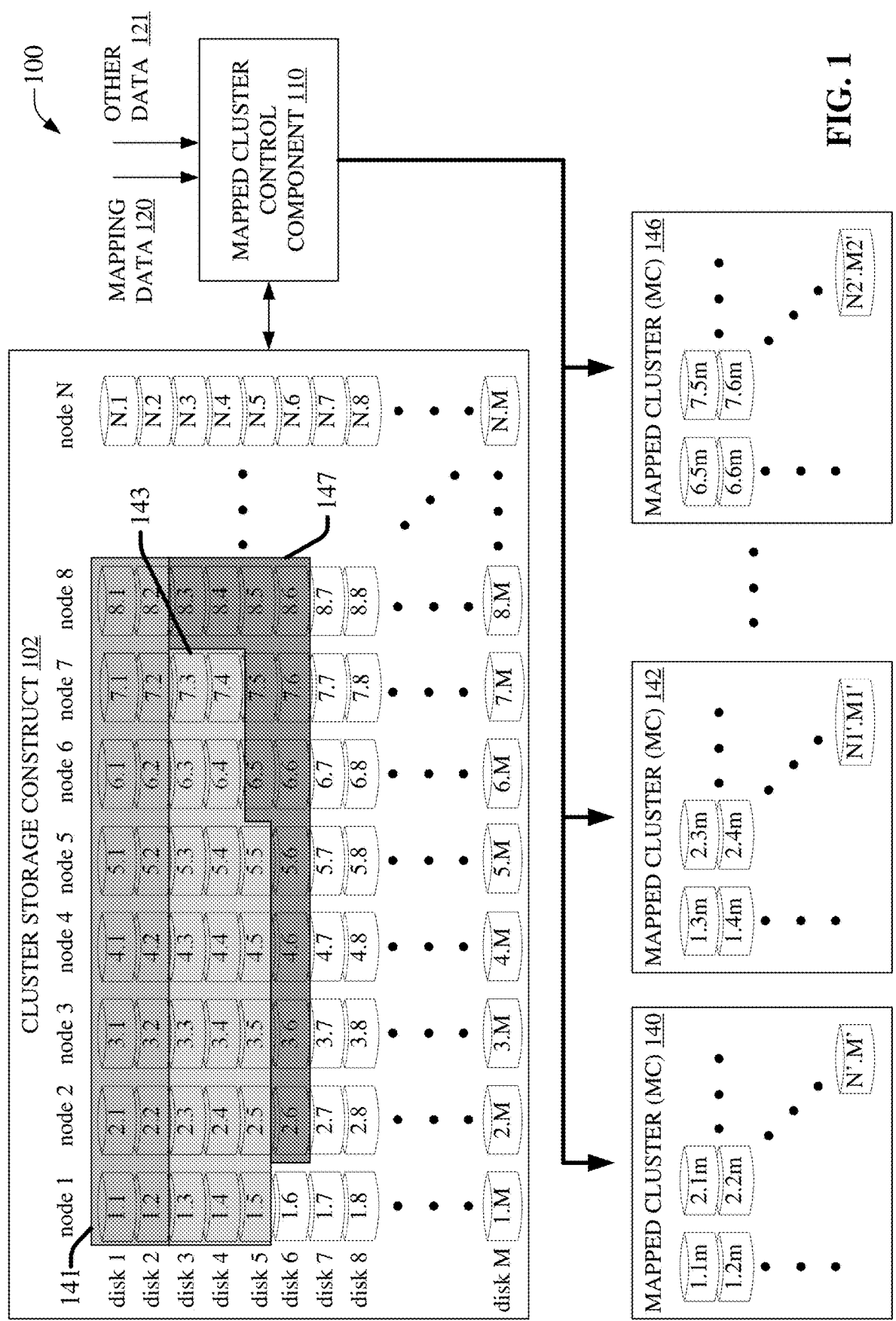
FIG. 1 is an illustration of an example system that can facilitate affinity sensitive data storage distribution of logical data across real storage devices resulting in a first distributed storage scheme for logical data in a real storage system, in accordance with aspects of the subject disclosure.

The subject disclosure is now described with reference to the drawings, wherein like reference numerals are used to refer to like elements throughout. In the following description, for purposes of explanation, numerous specific details are set forth in order to provide a thorough understanding of the subject disclosure. It may be evident, however, that the subject disclosure may be practiced without these specific details. In other instances, well-known structures and devices are shown in block diagram form in order to facilitate describing the subject disclosure.

As mentioned, data storage techniques can conventionally store data in one or more arrays of data storage devices, hereinafter a cluster, real cluster, cluster storage construct, etc. As an example, data can be stored in an ECS system such as is provided by DELL EMC. The example ECS system can comprise data storage devices, e.g., disks, etc., arranged in nodes, wherein nodes can be comprised in an ECS cluster. One use of data storage is in bulk data storage. Data can conventionally be stored in a group of nodes format for a given cluster, for example, in a conventional ECS system, all disks of nodes comprising the group of nodes are considered part of the group. As such, a node with many disks can, in some conventional embodiments, comprise a large amount of storage that can go underutilized. As such, it can be desirable to have more granular logical storage groups that can employ portions of larger real groups, thereby facilitating efficient computer resource usage, e.g., via larger real groups, but still providing smaller logical groups that can be used more efficiently for storing smaller amounts of data therein.

In an embodiment of the presently disclosed subject matter, a mapped redundant array of independent nodes, hereinafter a mapped RAIN, can comprise a mapped cluster, wherein the mapped cluster comprises a logical arrangement of storage locations of real storage devices. In a mapped cluster, a real cluster(s), e.g., a group of real storage devices comprised in one or more hardware nodes that can be comprised in one or more clusters, can be defined so as to allow more granular use of the real cluster in contrast to conventional storage techniques. In an aspect, a mapped cluster can comprise mapped nodes that can provide data redundancy that, in an aspect, can allow for failure of a portion of one or more mapped nodes of the mapped cluster without loss of access to stored data, can allow for removal/addition of one or more nodes from/to the mapped cluster without loss of access to stored data, etc. As an example, a mapped cluster can comprise mapped nodes having a data redundancy scheme analogous to a redundant array of independent disks (RAID) type-6, e.g., RAID6, also known as double-parity RAID, etc., wherein employing a mapped node topology and two parity stripes on each mapped node can allow for two mapped node failures before any data of the mapped cluster may become inaccessible, etc. In other example embodiments, a mapped cluster can employ other mapped node topologies and parity techniques to provide data redundancy, e.g., analogous to RAID0, RAID1, RAID2, RAID3, RAID4, RAID5, RAID6, RAID0+1, RAID1+0, etc., wherein a mapped node of a mapped cluster can comprise one or more mapped disks, and the mapped node can be loosely similar to a disk in a RAID system. Unlike RAID technology, an example mapped RAIN system can provide access to more granular storage in, for example, very large data storage systems that can often on the order of terabytes, petabytes, exabytes, zettabytes, or even larger, because each mapped node can generally comprise a plurality of mapped disks, unlike RAID technologies.

In an embodiment, software, firmware, etc., can hide the abstraction of mapping nodes in a mapped RAIN system, e.g., the group of mapped nodes can appear to be a contiguous block of data storage even where, for example, it can be spread across multiple portions of one or more real disks, multiple real groups of hardware nodes (a real RAIN), multiple real clusters of hardware nodes (multiple real RAINs), multiple geographic locations, etc. For a given real cluster, e.g., real RAIN, that is N real nodes wide and M real disks deep, a mapped RAIN can consist of up to N' mapped nodes and manage up to M' mapped disks, e.g., portions of real disks of the constituent real nodes. Accordingly, in an embodiment, one mapped node can be expected to manage mapped disks constituted from different real disks of real nodes of one or more real clusters. Similarly, in an embodiment, portions of real disks of one real node can be expected to be managed by mapped nodes of one or more mapped RAIN clusters. In some embodiments, a mapped cluster can be forbidden from using two real disks of one real node, which can harden the mapped RAIN cluster against a failure of the one real node that may otherwise compromise the two or more mapped nodes/disks of the mapped RAIN cluster, e.g., a data loss event, etc. Hereinafter, a portion of a real disk can be comprised in a real node that can be comprised in a real cluster and, furthermore, a portion of the real disk can correspond to a portion of a mapped disk, a mapped disk can comprise one or more portions of one or more real disks, a mapped node can comprise one or more portions of one or more real nodes, a mapped cluster can comprise one or more portions of one or more real clusters, etc., and, for convenience, the term RAIN can be omitted for brevity, e.g., a mapped RAIN cluster can be referred to simply as a mapped cluster, a mapped RAIN node can simply be referred to as a mapped node, etc., wherein 'mapped' is intended to convey that the mapped node is an abstraction of real storage space that is distinct from a real node and the corresponding real physical hardware component(s) of the real node, e.g., while data is actually storage on a real cluster/node/disk, the data storage can abstracted to appear as being stored in a mapped cluster/node/disk such that one or more mapped cluster/node/disk can be 'built on top' of a real cluster/node/disk. As an example, a data storage customer can use a mapped cluster for data storage whereby the storage data is actually stored in various real data storage locations of a real data storage system, e.g., a real cluster, etc., according to a logical mapping between the real cluster and the mapped cluster. This example can enable the mapped cluster to have more granular data storage than in conventional allocation of storage space from real clusters.

In an embodiment, a mapped cluster can be comprised in a real cluster, e.g., the mapped cluster can be N' mapped nodes by M' mapped disks in size and the real cluster can be N real nodes by M real disks in size, where N'=N and where M'=M. In other embodiments, N' can be less than, or equal to, N, and M' can be less than, or equal to, M. While it is also possible that N' can be less than N, this is generally disfavored due to potential data loss events, as is discussed in more detail below. It will be noted that in some embodiments, M' can be larger than M, e.g., where the mapping of a M real disks into M' mapped disks portions comprises use of a part of one of the M disks, for example, 10 real disks (M=10) can be mapped to 17 mapped disk portions (M'=17), can be mapped to 11 mapped disk portions (M'=11), can be mapped to 119 mapped disk portions (M'=119), etc. In some embodiments, the mapped cluster can be smaller than the real cluster. Moreover, where the mapped cluster is sufficiently small in comparison to the real cluster, the real cluster can accommodate one or more additional mapped clusters. In an aspect, where mapped clusters are smaller than a real cluster, the mapped cluster can provide finer granularity of the data storage system. As an example, where the real cluster is 8×8, e.g., 8 real nodes by 8 real disks, then, for example, four mapped 4×4 clusters can be provided, wherein each of the four mapped 4×4 clusters is approximately ¼th the size of the real cluster. As a second example, given an 8×8 real cluster 16 mapped 2×2 clusters can be provided where each mapped cluster is approximately ¹⁄₁₆th the size of the real cluster. As a third example, for the 8×8 real cluster, 2 mapped 4×8 or 8×4 clusters can be provided and each can be approximately ½ the size of the real cluster. Additionally, the example 8×8 real cluster can provide a mix of different sized mapped clusters, for example one 8×4 mapped cluster, one 4×4 mapped cluster, and four 2×2 mapped clusters. In some embodiments, not all of the real cluster must be comprised in a mapped cluster, e.g., an example 8×8 real cluster can comprise only one 2×4 mapped cluster with the rest of the real cluster not (yet) being allocated into mapped storage space.

An affinity metric can be employed, in some embodiments, to guide mapping between portions of a real cluster and a mapped cluster. An affinity metric can reflect a distribution of mapped cluster portions in a real cluster. As an example, in an 8×8 real cluster supporting a 4×4 mapped cluster, the 16 mapped disks of the 4×4 mapped cluster can be distributed in different manners within the 8×8 real cluster, for example, in 8 real disks of each of two real nodes, in four real disks of each of four real nodes, in two real disks of each of 8 real nodes, in four real disks of one real node and in two real disks of each of six other real nodes, etc. In this example, each of the different distributions can be associated with a corresponding affinity score that reflects the distribution across the real cluster. As such, for example, mapping of the 4×4 mapped cluster into the 8×8 real cluster as 8 real disks of each of two real nodes can be associated with a first affinity score because all of the data of the mapped cluster can be distributed across just two of the possible 8 real nodes, e.g., there is affinity between relatively few of the real nodes for the 4×4 mapped cluster. Similarly, mapping of the 4×4 mapped cluster into the 8×8 real cluster as two real disks of each of 8 real nodes can be associated with a second affinity score, that can be different from the first affinity score, because all of the data of the mapped cluster can be distributed across all 8 of the possible 8 real nodes, e.g., there is affinity between all of the real nodes for the 4×4 mapped cluster.

In an aspect, affinity reflecting broader distribution of mapped cluster data across a real cluster can be associated with higher availability of the data stored in the mapped cluster. If data is broadly distributed, there can be loss of access to less data, e.g., more data remains accessible, in the event of the loss of a real node of the real cluster. This can be appreciated in the preceding example, whereby in the mapping of the 4×4 mapped cluster into the 8×8 real cluster as 8 real disks of each of two real nodes can result in reduced access to data stored in 8 reals disks if there is a loss of just one of the two real nodes. This is in contrast to a reduced access to data stored in just two real disks for the loss of one real node where the mapping of the 4×4 mapped cluster into the 8×8 real cluster was by two real disks of each of 8 real nodes. Moreover, even where data redundancy of the mapped cluster can enable recovery of data stored in a less accessible real node, a broader distribution can correspondingly spread a recovery task across a greater number of real nodes. As an example, recovery of one lost node in the mapping of the 4×4 mapped cluster into the 8×8 real cluster as 8 real disks of each of two real nodes can result in an attempt to rebuild the data stored on less accessible real node based on the data stored on the remaining accessible real node, which can put a high demand on the processor of the remaining accessible real node. This example can be contrasted with another example that can attempt to recover one lost node in the mapping of the 4×4 mapped cluster into the 8×8 real cluster as two real disks of each of eight real nodes can result, which can accordingly burden processors of the seven other accessible real nodes. Paraphrasing the above examples, a lower affinity score can correspond to data being stored by fewer real nodes, which can, in turn, increase an amount of less accessible data should a real node becomes less accessible, and can also be associated with a higher computer resource burden during a recovery from a real node becoming less accessible than can be experienced where data is more broadly distributed across real nodes of a real cluster.

In some embodiments, other metrics, e.g., comprise in or determined from, for example, mapping data 120, 220, etc., other data 121, 221, etc., or other sources that are not illustrated for clarity and brevity, can also be employed in conjunction with an affinity metric to guide storage of data of a mapped cluster in a real cluster. As an example, a first real node of a real cluster can comprise older hardware that may not perform as quickly, reliably, etc., as newer hardware of a second real node of the real cluster, e.g., other data 121 can provide key performance indicator data for real node hardware, etc., whereby it can be desirable to both widely distribute the data storage, e.g., a high affinity score, thereby gaining the aforementioned benefits, but can also be desirable to more heavily burden the second real node based on the better performance in contrast to the first real node. The affinity score can be employed in conjunction with the difference in performance to achieve a different distribution than may be achieved with strictly the affinity score or strictly the performance information. Moreover, the affinity metric and/or the other metrics can be weighted to adjust the level of influence they assert in determining a distribution of data from a mapped cluster into a real cluster.

Other metrics can include, processor factors such as count, speed, etc., memory factors such as an amount of memory, speed, throughput, etc., network factors such as bandwidth, cost, latency, reliability, etc., location, reliability, monetary cost, geopolitical factors, etc. Moreover, other aspects of the disclosed subject matter provide additional features generally not associated with real cluster data storage. In some embodiments, a mapped cluster can comprise storage space from more than one real cluster. In some embodiments, a mapped cluster can comprise storage space from real nodes in different geographical areas. In some embodiments, a mapped cluster can comprise storage space from more than one real cluster in more than one geographic location. As an example, a mapped cluster can comprise storage space from a cluster having hardware nodes in a data center in Denver. In a second example, a mapped cluster can comprise storage space from a first cluster having hardware nodes in a first data center in Denver and from a second cluster also having hardware nodes in the first data center in Denver. As a further example, a mapped cluster can comprise storage space from both a cluster having hardware nodes in a first data center in Denver and a second data center in Denver. As a still further example, a mapped cluster can comprise storage space from a first cluster having hardware nodes in a first data center in Seattle, Wash., and a second data center having hardware nodes in Tacoma, Wash. As yet another example, a mapped cluster can comprise storage space from a first cluster having hardware nodes in a first data center in Houston, Tex., and a second cluster having hardware nods in a data center in Mosco, Russia. Accordingly, in regards to affinity and/or other metrics, in an example, a real cluster can comprise data storage in a first data center located in Seattle, which can be subject to earthquakes, frequent violent political events, etc., and in a second data center located in Spokane, which can be less prone to earthquakes and political events, whereby spreading data, based on an affinity metric and other metrics, e.g., risks form earthquake and riots, can slightly favor a higher ratio of data storage in real nodes of the Spokane portion of the real cluster, e.g., more of the total data can be stored in Spokane than in Seattle because it can be less at risk while still spreading the data storage across real nodes located in both Seattle and Spokane. Numerous other examples are to be readily appreciated by one of skill in the art, and all such examples are considered within the scope of the present disclosure, even where not recited for the sake of clarity and brevity.

To the accomplishment of the foregoing and related ends, the disclosed subject matter, then, comprises one or more of the features hereinafter more fully described. The following description and the annexed drawings set forth in detail certain illustrative aspects of the subject matter. However, these aspects are indicative of but a few of the various ways in which the principles of the subject matter can be employed. Other aspects, advantages, and novel features of the disclosed subject matter will become apparent from the following detailed description when considered in conjunction with the provided drawings.

FIG. 1 is an illustration of a system 100, which can facilitate affinity sensitive data storage distribution of logical data across real storage devices resulting in a first distributed storage scheme for logical data in a real storage system, in accordance with aspects of the subject disclosure. System 100 can comprise mapped cluster control component 110. Mapped cluster control component 110 can receive mapping data 120 and can facilitate-mapped clusters, e.g., MC 140-146, etc., based on mapping data 120. Mapped cluster control component 110 can also receive other data 121 that can also facilitate mapping mapped clusters, for example, a mapping rule(s), a mapping scheme, a real disk/real node/ real cluster selection criterion, etc. In an aspect, mapped cluster component 110 can generate, maintain, adapt, delete, release, etc., mapped clusters based on mapping data 120, other data 121, etc. Moreover, a mapped cluster, e.g., MC 120-146, etc., can be a logical storage cluster built on top of a real cluster(s), e.g., cluster storage construct 102. As an example, MC 140 can be a 4×4 mapped cluster, e.g., four mapped nodes of four mapped disks on each mapped node for a total of 16 mapped disks, etc., that can be mapped to storage of data on 16 real disks of a real cluster, for example, 8×2 real cluster portion 141, e.g., eight real nodes of two real disks each, of cluster storage construct 102, etc.

In an aspect, mapped disks and mapped nodes of a mapped cluster can map to nearly any constellation of real storage locations, e.g., real disks, real nodes, real clusters, or portions thereof, etc. In an aspect, the 4×4 mapped cluster of the previous example could similarly be mapped to data storage in a 2×8 portion of a real cluster, e.g., the 2×8 portion 241 of cluster storage construct 202, etc. Similarly, the 4×4 mapped cluster of the previous example could alternatively be mapped to four 2×2 portions of a real cluster, sixteen 1×1 portions of a real cluster, one 4×2 portion and two 2×2 portions of a real cluster, etc. Generally, according to a data loss prevention rule, mapped clusters can comprise nearly any configuration of real storage areas, except two real disks of one real node should not be mapped with two different mapped nodes of one mapped cluster. This can reduce potential data loss events where a single mapped cluster that comprises two mapped nodes that each use real disks of the same real node, such that a data loss event could occur if the real node becomes less accessible, e.g., if the real node fails, slows, crashes, reboots, is damaged, etc. As an example, if the 4×4 example mapped cluster is mapped to data storage in a 2×8 portion of the real cluster, rather than for example into an 8×2 portion of the real cluster, then failure of one of the two real nodes of the real cluster may compromise data stored in two of the four mapped nodes of the mapped cluster. If the example mapped cluster employs data redundancy allowing the loss of only one mapped node, then the loss of two mapped nodes can result in a data loss event. As such, it can generally be prescribed that the example 4×4 mapped cluster be mapped into at least four real nodes of a real cluster, although it can certainly be mapped to nearly any disk of the four real nodes, and similarly, can be mapped to more than four real nodes, etc., wherein the mapping does not result in data stored according to the mapped cluster causing data in two mapped nodes to be stored in one real node. In some embodiments, a mapped cluster(s) can be hardened to withstand the loss of more than one mapped node and the data loss prevention rule can correspondingly be in accord with this more rugged mapped cluster implementation. These other data loss prevention rules are not further discussed simply for clarity and brevity, although all such other data loss prevention rules are within the scope of the instant disclosure.

In an aspect, while a nearly arbitrary mapping of a mapped cluster into a real cluster can provide flexibility, granularity, and dynamic adaptation of a mapped cluster, it can be desirable to determine, rank, select, etc., mappings that can provide high accessibility to data stored via a mapped cluster. High accessibility can relate to data remaining accessible in during a period in which some portion of a real cluster(s) becomes less accessible, e.g., a real node fails/reboots/etc., a network connection to a real node becomes sluggish, fails, etc., or nearly any other cause of accessing data stored in a real storage location and mapped to a mapped cluster becoming less accessible, not accessible, etc. As an example, where MC 140 is mapped to portion 141, in FIG. 1, a slow network connection to node 2 of cluster storage construct 102 can reduce access to data stored in real disk 2.1 and 2.2 for MC 140. Additionally, in this example, the lowered access to node 2 of cluster storage construct 102 can also reduce access to data stored on other real disks mapped to other MCs, e.g., real disks 2.3-2.5 of portion 143 can be less accessible to corresponding MC 142, real disk 2.6 of portion 147 can be less accessible to corresponding MC 146, etc. However, FIG. 1 presents an example of higher accessibility than is illustrated in FIG. 2, because even though access to data stored in real disk 2.1 and 2.2 for MC 140 is reduced by the example slow network connection, data stored in nodes 1 and 3-8 of cluster storage construct 102, can remain accessible at normal levels, e.g., nodes 1 and 3-8 of portion 141 can provide normal access to data stored according MC 140.

In an aspect, high availability can also be associated with more distributed data recovery. Again returning to the earlier example 4×4 mapped cluster, storing of data in a 2×8 portion of a real cluster, which also violates the typical data loss prevention rule mentioned hereinabove, loss of the second real node can result in computer resources of the remaining first real node being burdened with the entire recovery of the data lost in the failure of the second real node. However, even where the earlier example 4×4 mapped cluster stores data in a 4×4 portion of a real cluster that does not violate the typical data loss prevention rule, loss of one of the four real nodes can result in the computer resources of the remaining three real nodes being burdened with the recovery of the data stored on the lost real node, for example where each remaining real node has a computer resource burden of ⅓ of the recovery process, etc. This can be contrasted with mapping the 4×4 mapped node to an example 8×2 real portion of a real cluster that, in response to the loss of one of the eight real nodes can result, for example, in each of the remaining real nodes shouldering ⅐th of the computer resource burden to recover the data stored on the lost real node. It will be noted that placing a lower burden on the computer resources of a real node for recovery of a less accessible node can allow the real node to allocate more of the computer resources to other computing tasks, e.g., enabling access to data for other mapped nodes that have corresponding data mapped to the real node. As an example, where a 4×4 mapped node is mapped to a 2×8 portion of a real cluster, and a first real node is lost, then the remaining second real node can be tasked with recovering 8 disks of lost data that were stored on the real disks of the first real node. This can burden the processor, memory, etc., e.g., computer resources, of the second real node more heavily than where the 4×4 mapped node is mapped to an 8×2 portion of the real cluster, which can result in the second real node being tasked with, for example, recovery of only two real disks of data for the same loss of the first real node.

Figure 2:
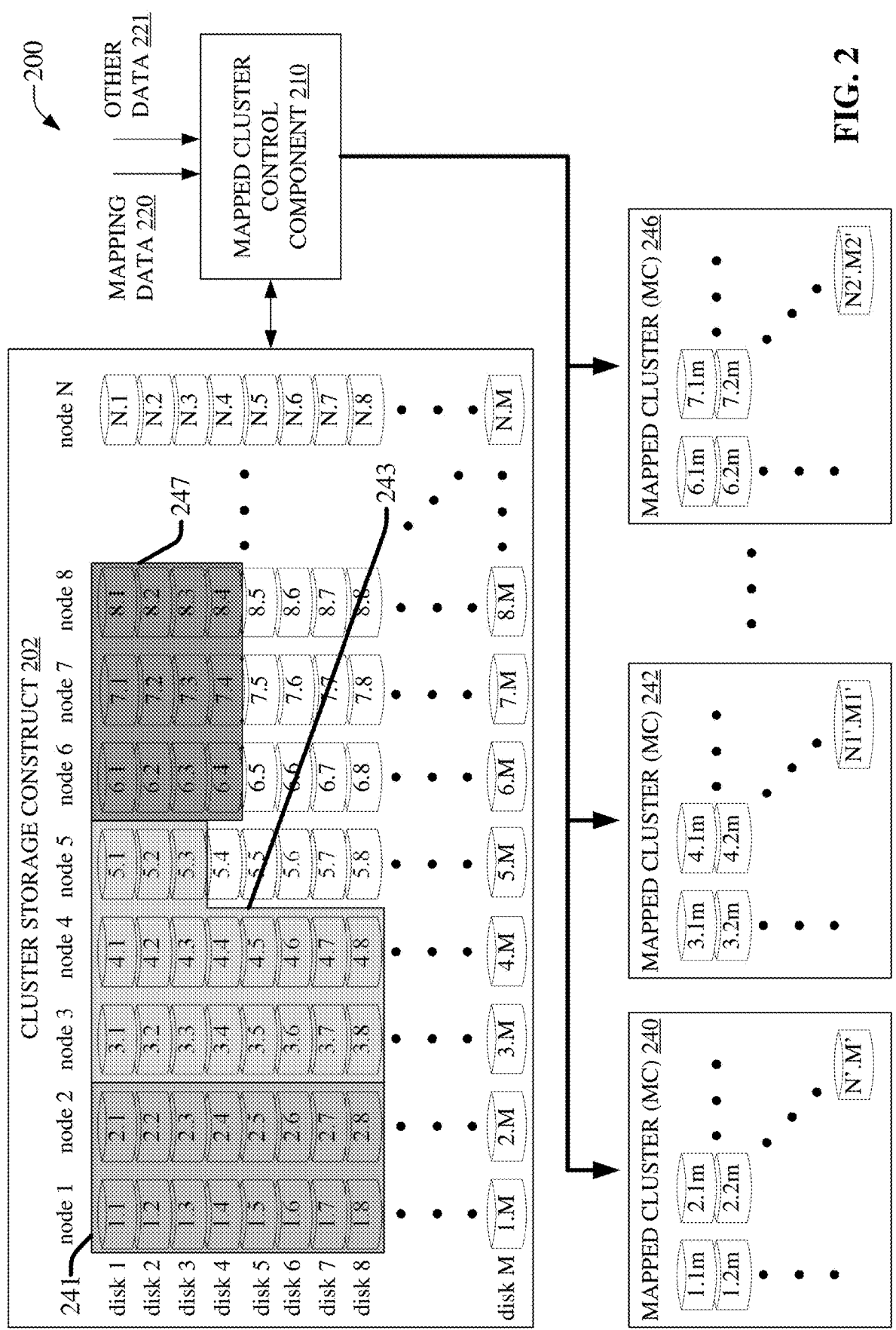
FIG. 2 is an illustration of an example system that can facilitate affinity sensitive data storage distribution of logical data across real storage devices resulting in a second distributed storage scheme for logical data in a real storage system, in accordance with aspects of the subject disclosure.

FIG. 2 is an illustration of a system 200, which can enable affinity sensitive data storage distribution of logical data across real storage devices resulting in a second distributed storage scheme for logical data in a real storage system, in accordance with aspects of the subject disclosure. System 200 can comprise mapped cluster control component 210. Mapped cluster control component 210 can receive mapping data 220 and can facilitate mapped clusters, e.g., MC 240-246, etc., based on mapping data 220. Mapped cluster control component 210 can also receive other data 221 that can also facilitate mapping mapped clusters, for example, a mapping rule(s), a mapping scheme, a real disk/real node/real cluster selection criterion, etc. In an aspect, mapped cluster component 210 can generate, maintain, adapt, delete, release, etc., mapped clusters based on mapping data 220, other data 221, etc. Mapped clusters 220-246, etc., can be logical clusters mapping data storage into cluster storage construct 202. As an example, MC 240 can be a 4×4 mapped cluster, e.g., four mapped nodes of four mapped disks on each mapped node for a total of 16 mapped disks, etc., that can be mapped to storage of data on 16 real disks of a real cluster, for example, 2×8 real cluster portion 241. It is noted that real cluster portion 241 being a 2×8 portion of cluster storage construct 202 is generally disfavored because it can violate the aforementioned data loss prevention rule, but this example is employed because it can more clearly illustrate certain aspects of the subject disclosure. It is further noted that these certain aspects are similarly supported in mappings can be in accord with a data loss prevention rule, even where not explicitly recited for the sake of clarity and brevity.

System 200 can illustrate a lower accessibility than is illustrated in FIG. 1 for system 100. This lower accessibility can relate to loss of a real node, for example node 1 of cluster storage construct 202, resulting in data access being relegated to fewer other real nodes that support a mapped node, e.g., where MC 240 is mapped to portion 241, loss of node 2 of cluster storage construct 202 can reduce access to data stored in real disk 2.1 through 2.8 for MC 240, ignoring possible data loss events associated with violation of a data loss prevention rule. This can be contrasted to the higher accessibility illustrated in FIG. 1, where only data stored in real disk 2.1 and 2.2 for MC 140 is less accessible due to the loss of node 2 of cluster storage construct 102. Additionally, the computer resources of node 1 of cluster storage construct 202 now are tasked with every data access event for any data remaining accessible in MC 240. This is again in contrast to FIG. 1, wherein loss of node 2 of cluster storage construct 102 can be associated with computer resources of nodes 1 and 3-8 each bearing some of the burden for accessing unaffected data in MC 140, e.g., further data access is spread across seven real node processors/memory/etc. in system 100, rather than only one processor/memory/etc., in system 200.

In an aspect, low availability can also be associated with less distributed data recovery. Again returning to the earlier example 4×4 mapped cluster, storing of data in a 2×8 portion of a real cluster, loss of the second real node can result in computer resources of the remaining first real node being burdened with the entire recovery of the data lost in the failure of the second real node. This can be contrasted with mapping the 4×4 mapped node to an example 8×2 real portion of a real cluster, for example portion 140 of FIG. 1, that, in response to the loss of one of the eight real nodes can recover lost data via computer resources of each of the remaining real nodes of portion 140. It will be noted that placing a higher burden on the computer resources of a real node for recovery of a less accessible node can restrict the real node from allocating computer resources to other computing tasks of the real node, such as, enabling access to other data for other mapped nodes that have data mapped into the same real node. As an example, where a 4×4 mapped node, such as MC 240, is mapped to a 2×8 portion of a real cluster, such as portion 241, and a first real node is lost, then the remaining second real node can be tasked with recovering 8 disks of lost data that were stored on the real disks of the first real node. This can burden the computer resources of the second real node more heavily than where the 4×4 mapped node is mapped to an 8×2 portion of the real cluster, such as portion 140 in FIG. 1, which can result in the second real node being tasked with, for example, recovery of only two real disks of data for the same loss of the first real node. Portions 243, 247, etc., display similar low availability in contrast to higher availability illustrated in portions 143, 147, etc., of FIG. 1, e.g., loss of real node 3 of cluster storage construct 202 can burden computer resources of nodes 4 and 5 for data recovery, reduce available computer resources for other tasks of nodes 4 and 5, can result in a data loss event where a data loss prevention rule is not satisfied, can limit access to a larger portion of the data stored via corresponding MC 242, etc., and similar effects can be experience in portion 247 and corresponding MC 246, etc.

Figure 3:
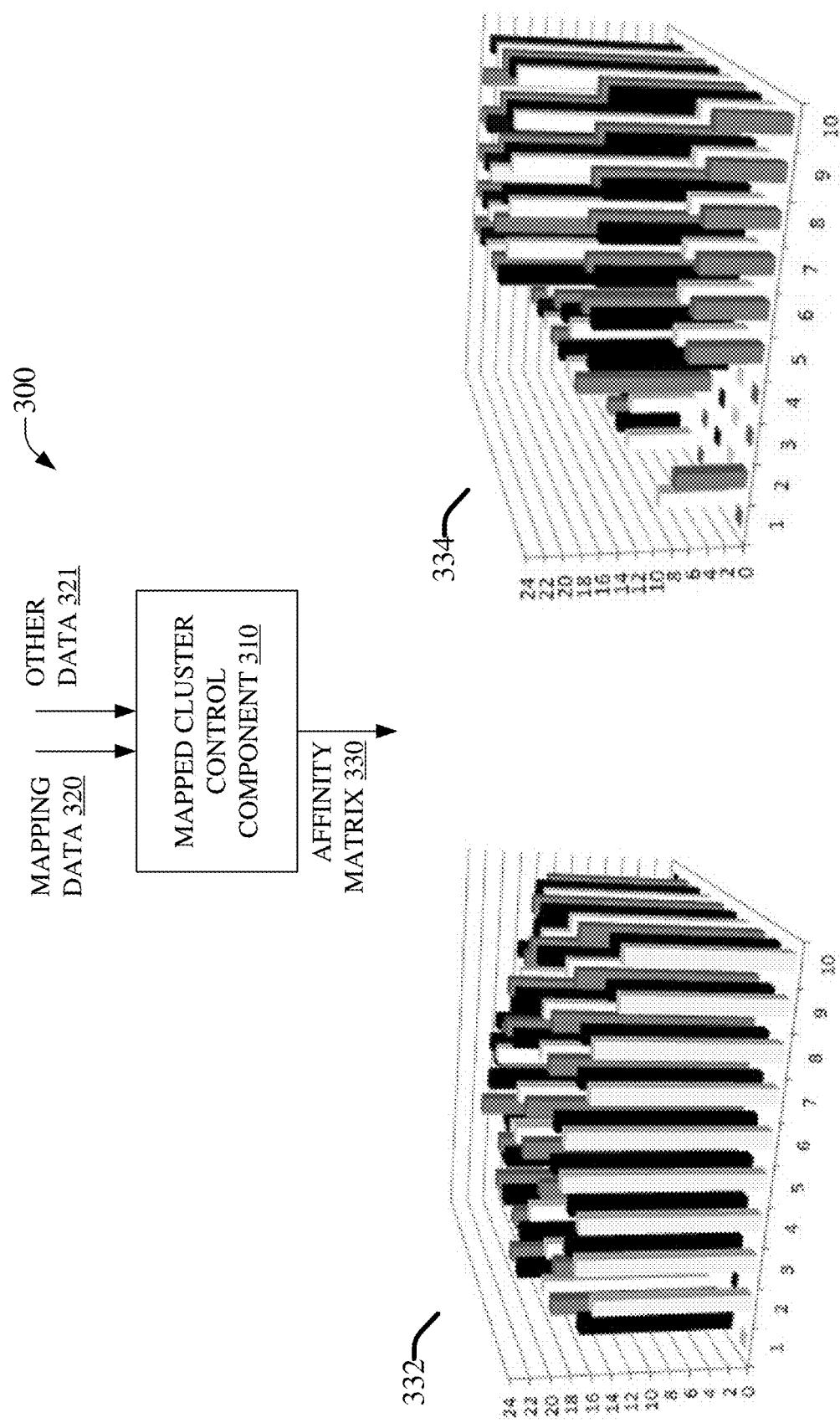
FIG. 3 is an illustration of an example system that can enable determining an affinity matrix facilitating affinity sensitive data storage distribution of logical data across real storage devices, in accordance with aspects of the subject disclosure.

FIG. 3 is an illustration of a system 300, which can facilitate determining an affinity matrix facilitating affinity sensitive data storage distribution of logical data across real storage devices, wherein the convolved data represents a group of more than two data chunks, in accordance with aspects of the subject disclosure. System 300 can comprise mapped cluster control component 310. Mapped cluster control component 310 can receive mapping data 320 and can facilitate mapped clusters, e.g., MC 140-246, 240-246, etc., based on mapping data 320. Mapped cluster control component 310 can also receive other data 321 that can also facilitate mapping mapped clusters, for example, a mapping rule(s), a mapping scheme, a real disk/real node/real cluster selection criterion, etc. In an aspect, mapped cluster component 310 can generate, maintain, adapt, delete, release, etc., mapped clusters based on mapping data 320, other data 321, etc.

In an aspect, mapped cluster control component 310 can generate an affinity matrix 330, e.g., a representation of values comprised in example affinity matrices can be, for example, affinity plot 332, 334, etc. An affinity plot can be illustrate affinity values from an N×N affinity matrix 330, for example, plot 332 is 10×10 with values plotted in the vertical, e.g., ranging from 0 to 24, plot 334 is 10×10 also with values again plotted in the vertical.

An affinity between real nodes can be based on a count of real disks participating in a mapped cluster. A higher affinity score can indicate that a real node comprises real disks participating in more mapped clusters than a real node with a lower affinity score, e.g., the real node can increase an affinity score by having disks participating in more mapped nodes and thereby having an affinity with more other real nodes. In this way, if the real node fails, a greater number of other real nodes can participate in recovery of data of the failed real node to another node, and in turn, this can result in a shorter duration of recovery where the task of recovery is spread across the computer resources of more real nodes. Recovery can be to available real disks of nodes other than the lost node, e.g., to another real node of the portion, expanding the portion to include an additional real node as a substitute for the failed real node, etc. Where data is recovered in shorter times, a probability of multiple simultaneous node failures can be correspondingly reduced. As an example, if a 2×4 mapped cluster is mapped to a 4×2 real portion, the loss of one real node can result in recovery of data of two lost real disks in the lost real node, whereby the remaining three real nodes can participate in the recovery of the lost 2 real disk's data, e.g., each remaining node can be said to be apportioned recovery of $\frac{2}{3}$rds of a lost disk based on two disks being recovered by three nodes. If recovery of a lost disk is said to take 12 hours, then recovery of the two lost disks can take 8 hours for three remaining real nodes, e.g., 12*(⅔). In contrast, where the example 2×4 mapped cluster is mapped to a 2×4 real portion, then the recovery of the lost 4 disks can be apportioned to the one remaining real node, resulting in a recovery time of 12 hours per disk for each of 4 lost disks, which equals 48 hours recovery. In the example mapping to a 4×2 portion, a loss of a further real node occurring at 24 hours after the first lost real node would be manageable because the data recovery from the first lost node would already have been recovered from after 8 hours, which is in noteworthy contrast to the mapping to the 2×4 portion, which can still be in the middle of recovering the data after 24 hours from the first loss, and the further loss of another real node can result in a data loss event.

Accordingly, it can be desirable to have higher affinity between real nodes which can reflect broader distribution of data storage. In an aspect, an affinity matrix can be employed to assess distribution of storage in real nodes for corresponding mapped clusters. An affinity matrix can be a square N×N matrix, where N can be a number of real nodes in a real cluster. A value X(i,j) in an affinity matrix can indicate a number of disks an $i^{th}$ real node and jth real node donate to a same mapped cluster. It will be noted that X(i,i)=0, and further noted that X(i,j)=X(j,i). The greater the level of similarity in affinity values across an affinity matrix can indicate a more robust storage scheme, e.g., when values X(i,j|i!)=j are more similar the storage scheme is generally more robust than when the values are less similar, which can result in stored data being more accessible, that is, more data can be accessed even in the event of a real node becoming less accessible. Further, recovery of data from a less accessible real node is also improved, as previously discussed, when the values are more similar in contrast to the values being less similar.

In this regard, affinity plot 332 can illustrate more similarity, less deviation, etc., for affinity scores among real nodes in an N×N affinity matrix than those illustrated in affinity plot 334. Affinity plot 332 can reflect a "good" mapping of Mapped RAIN 1, an 8×8 mapped cluster (as BOLD portions in Real RAIN), and Mapped RAIN 2, an 8×4 mapped cluster (as underscored portions in Real RAIN), with Real RAIN, a 10×12 real cluster (non-bold and non-underlined portions can be unused storage in the real cluster):

a) Real RAIN

| | | _____ nodes _____ | | | | | | | | | |
|---|---|---|---|---|---|---|---|---|---|---|---|
| | | 1 | 2 | 3 | 4 | 5 | 6 | 7 | 8 | 9 | 10 |
| disks | 1 | 1.1 | 2.1 | 3.1 | 4.1 | 5.1 | 6.1 | 7.1 | 8.1 | 9.1 | 10.1 |
| | 2 | 1.2 | 2.2 | 3.2 | 4.2 | 5.2 | 6.2 | 7.2 | 8.2 | 9.2 | 10.2 |
| | 3 | 1.3 | 2.3 | 3.3 | 4.3 | 5.3 | 6.3 | 7.3 | 8.3 | 9.3 | 10.3 |
| | 4 | 1.4 | 2.4 | 3.4 | 4.4 | 5.4 | 6.4 | 7.4 | 8.4 | 9.4 | 10.4 |
| | 5 | <u>1.5</u> | <u>2.5</u> | 3.5 | 4.5 | 5.5 | 6.5 | 7.5 | 8.5 | <u>9.5</u> | <u>10.5</u> |
| | 6 | <u>1.6</u> | <u>2.6</u> | 3.6 | 4.6 | 5.6 | 6.6 | 7.6 | 8.6 | <u>9.6</u> | <u>10.6</u> |
| | 7 | <u>1.7</u> | <u>2.7</u> | 3.7 | 4.7 | 5.7 | 6.7 | 7.7 | 8.7 | <u>9.7</u> | <u>10.7</u> |
| | 8 | <u>1.8</u> | <u>2.8</u> | 3.8 | 4.8 | 5.8 | 6.8 | 7.8 | 8.8 | <u>9.8</u> | <u>10.8</u> |
| | 9 | 1.9 | 2.9 | <u>3.9</u> | <u>4.9</u> | <u>5.9</u> | <u>6.9</u> | <u>7.9</u> | <u>8.9</u> | 9.9 | 10.9 |
| | 10 | 1.10 | 2.10 | <u>3.10</u> | <u>4.10</u> | <u>5.10</u> | <u>6.10</u> | <u>7.10</u> | <u>8.10</u> | 9.10 | 10.10 |
| | 11 | 1.11 | 2.11 | 3.11 | 4.11 | <u>5.11</u> | <u>6.11</u> | 7.11 | 8.11 | 9.11 | 10.11 |
| | 12 | 1.12 | 2.12 | 3.12 | 4.12 | <u>5.12</u> | <u>6.12</u> | 7.12 | 8.12 | 9.12 | 10.12 | b) Mapped RAIN 1

| | | _____ mapped nodes _____ | | | | | | | |
|---|---|---|---|---|---|---|---|---|---|
| | | 1 | 2 | 3 | 4 | 5 | 6 | 7 | 8 |
| disks | 1 | 1.1 | 2.1 | 3.1 | 4.1 | 5.1 | 6.1 | 7.1 | 8.1 |
| | 2 | 1.2 | 2.2 | 3.2 | 4.2 | 5.2 | 6.2 | 7.2 | 8.2 |
| | 3 | 1.3 | 2.3 | 3.3 | 4.3 | 5.3 | 6.3 | 7.3 | 8.3 |
| | 4 | 1.4 | 2.4 | 3.4 | 4.4 | 5.4 | 6.4 | 7.4 | 8.4 |
| | 5 | 9.1 | 10.1 | 3.5 | 4.5 | 5.5 | 6.5 | 7.5 | 8.5 |
| | 6 | 9.2 | 10.2 | 3.6 | 4.6 | 5.6 | 6.6 | 7.6 | 8.6 |
| | 7 | 9.3 | 10.3 | 3.7 | 4.7 | 5.7 | 6.7 | 7.7 | 8.7 |
| | 8 | 9.4 | 10.4 | 3.8 | 4.8 | 5.8 | 6.8 | 7.8 | 8.8 | c) Mapped RAIN 2

| | | _____ mapped nodes _____ | | | | | | | |
|---|---|---|---|---|---|---|---|---|---|
| | | 1 | 2 | 3 | 4 | 5 | 6 | 7 | 8 |
| disks | 1 | 1.5 | 2.5 | 9.5 | 10.5 | 3.9 | 4.9 | 5.9 | 6.9 |
| | 2 | 1.6 | 2.6 | 9.6 | 10.6 | 3.1 | 4.1 | 5.1 | 6.1 |
| | 3 | 1.7 | 2.7 | 9.7 | 10.7 | 7.9 | 8.9 | 5.11 | 6.11 |
| | 4 | 1.8 | 2.8 | 9.8 | 10.8 | 7.1 | 8.1 | 5.12 | 6.12 |

Similarly, affinity plot 334 can reflect a "poor" mapping of Mapped RAIN 1, an 8×8 mapped cluster (as BOLD portions in Real RAIN), and Mapped RAIN 2, an 8×4 mapped cluster (as underscored portions in Real RAIN), with Real RAIN, a 10×12 real cluster (non-bold and non-underlined portions can be unused storage in the real cluster).

| a) Real RAIN |||||||||||
|---|---|---|---|---|---|---|---|---|---|---|
| | | nodes |||||||||
| | | 1 | 2 | 3 | 4 | 5 | 6 | 7 | 8 | 9 | 10 |
| disks | 1 | 1.1 | 2.1 | 3.1 | 4.1 | 5.1 | 6.1 | 7.1 | 8.1 | 9.1 | 10.1 |
| | 2 | <u>1.2</u> | 2.2 | 3.2 | 4.2 | 5.2 | 6.2 | 7.2 | 8.2 | 9.2 | 10.2 |
| | 3 | <u>1.3</u> | <u>2.3</u> | 3.3 | 4.3 | 5.3 | 6.3 | 7.3 | 8.3 | 9.3 | 10.3 |
| | 4 | <u>1.4</u> | <u>2.4</u> | 3.4 | 4.4 | 5.4 | 6.4 | 7.4 | 8.4 | 9.4 | 10.4 |
| | 5 | 1.5 | 2.5 | 3.5 | 4.5 | 5.5 | 6.5 | 7.5 | 8.5 | 9.5 | 10.5 |
| | 6 | 1.6 | 2.6 | 3.6 | 4.6 | 5.6 | 6.6 | 7.6 | 8.6 | 9.6 | 10.6 |
| | 7 | 1.7 | 2.7 | 3.7 | 4.7 | 5.7 | 6.7 | 7.7 | 8.7 | 9.7 | 10.7 |
| | 8 | 1.8 | 2.8 | 3.8 | 4.8 | 5.8 | 6.8 | 7.8 | 8.8 | 9.8 | 10.8 |
| | 9 | 1.9 | 2.9 | 3.9 | 4.9 | <u>5.9</u> | <u>6.9</u> | <u>7.9</u> | <u>8.9</u> | <u>9.9</u> | <u>10.9</u> |
| | 10 | 1.10 | 2.10 | 3.10 | 4.10 | <u>5.10</u> | <u>6.10</u> | <u>7.10</u> | <u>8.10</u> | <u>9.10</u> | <u>10.10</u> |
| | 11 | 1.11 | 2.11 | 3.11 | 4.11 | <u>5.11</u> | <u>6.11</u> | <u>7.11</u> | <u>8.11</u> | <u>9.11</u> | <u>10.11</u> |
| | 12 | 1.12 | 2.12 | 3.12 | 4.12 | <u>5.12</u> | <u>6.12</u> | <u>7.12</u> | <u>8.12</u> | <u>9.12</u> | <u>10.12</u> |

| b) Mapped RAIN 1 |||||||||
|---|---|---|---|---|---|---|---|---|
| | | mapped nodes ||||||||
| | | 1 | 2 | 3 | 4 | 5 | 6 | 7 | 8 |
| disks | 1 | 3.1 | 4.1 | 5.1 | 6.1 | 7.1 | 8.1 | 9.1 | 10.1 |
| | 2 | 3.2 | 4.2 | 5.2 | 6.2 | 7.2 | 8.2 | 9.2 | 10.2 |
| | 3 | 3.3 | 4.3 | 5.3 | 6.3 | 7.3 | 8.3 | 9.3 | 10.3 |
| | 4 | 3.4 | 4.4 | 5.4 | 6.4 | 7.4 | 8.4 | 9.4 | 10.4 |
| | 5 | 3.5 | 4.5 | 5.5 | 6.5 | 7.5 | 8.5 | 9.5 | 10.5 |
| | 6 | 3.6 | 4.6 | 5.6 | 6.6 | 7.6 | 8.6 | 9.6 | 10.6 |
| | 7 | 3.7 | 4.7 | 5.7 | 6.7 | 7.7 | 8.7 | 9.7 | 10.7 |
| | 8 | 3.8 | 4.8 | 5.8 | 6.8 | 7.8 | 8.8 | 9.8 | 10.8 |

| c) Mapped RAIN 2 |||||||||
|---|---|---|---|---|---|---|---|---|
| | | mapped nodes ||||||||
| | | 1 | 2 | 3 | 4 | 5 | 6 | 7 | 8 |
| disks | 1 | 1.1 | 2.1 | 5.9 | 6.9 | 7.9 | 8.9 | 9.9 | 10.9 |
| | 2 | 1.2 | 2.2 | 5.1 | 6.1 | 7.1 | 8.1 | 9.1 | 10.1 |
| | 3 | 1.3 | 2.3 | 5.11 | 6.11 | 7.11 | 8.11 | 9.11 | 10.1 |
| | 4 | 1.4 | 2.4 | 5.12 | 6.12 | 7.12 | 8.12 | 9.12 | 10.1 |

Visual comparison of affinity plot 332 to affinity plot 334 readily illustrates that affinity plot 332 is more evenly distributed and appears 'flatter' and that the affinity scores of a corresponding affinity matrix are generally all higher than for an affinity matrix corresponding to affinity plot 334. This flatness reflects that the mapping of mapped cluster disks to real cluster disks is more distributed among the real nodes of the real cluster, which can increase the accessibility of stored data, e.g., more data can be accessible in the event of a real node becoming less accessible, compromised data of the less accessible real node can be recovered more quickly and with more distribution of encumbered computer resources, etc., than for data storage reflected in affinity plot 334. In an embodiment, analysis of affinity scores, affinity matrixes, affinity plots, etc., can be employed in selected, ranking, scoring, etc., of mapping schema. As such, a mapping scheme that is determined to satisfy an affinity rule can be selected for use in storing data of a mapped cluster via a portion of a real cluster. As an example, a first affinity matrix 330 can be reflected in affinity plot 332 and a second affinity matrix 330 can be reflected in affinity plot 334. Where the first affinity matrix 330 has a flatter distribution of affinity scores than the second affinity matrix 330, as is illustrated in affinity plots 332 and 334, the mapping of mapped clusters can be performed according to a mapping scheme corresponding to the first affinity matrix 330.

In an aspect, system 300 can generate, store, compare, rank, score, etc., affinity matrixes to enable selection of a mapping scheme. In some embodiments, other data 321 can comprise a previously computed affinity matrix(es). This can enable modeling of mapping schema to be communicated to mapped cluster control component 310 to facilitate selection of a mapping scheme that can have affinities that can be determined to satisfy an affinity based selection rule. It will be noted that higher affinity and more even affinity can both be desirable. As an example, a very flat affinity plot with low affinity values can reflect a less robust mapping scheme than a slightly more irregular affinity plot with much higher affinity scores. In general, the higher the affinity scores and the less deviation among the affinity scores the more robust the data stored according to a corresponding mapping scheme. A low deviation and low affinity score can, for example, occur in a real cluster that maps many small mapped clusters, e.g., each small mapped cluster may only map to a few real disks which can be well distributed resulting in low affinity scores that have low deviation. A high deviation and high affinity score can occur where a few large mapped clusters are mapped to a real cluster in a poorly distributed manner, e.g., some mapped clusters can be widely distributed in the real cluster and other mapped clusters can be narrowly distributed in the real cluster which can lead to high deviation with some very high affinity scores and some very low affinity scores. In an aspect, a rank or score of an affinity matrix can therefore reflect high affinity values and less distribution, e.g., where a higher rank is 'good', a rank of an affinity matrix can be incremented for low deviation, for a high affinity value, etc., and can be decremented for a high deviation, for a low affinity value, etc., enabling selection of a mapping scheme corresponding to a higher ranked affinity matrix which can result in a more robust mapping of data between mapped clusters and a real cluster.

Figure 4:
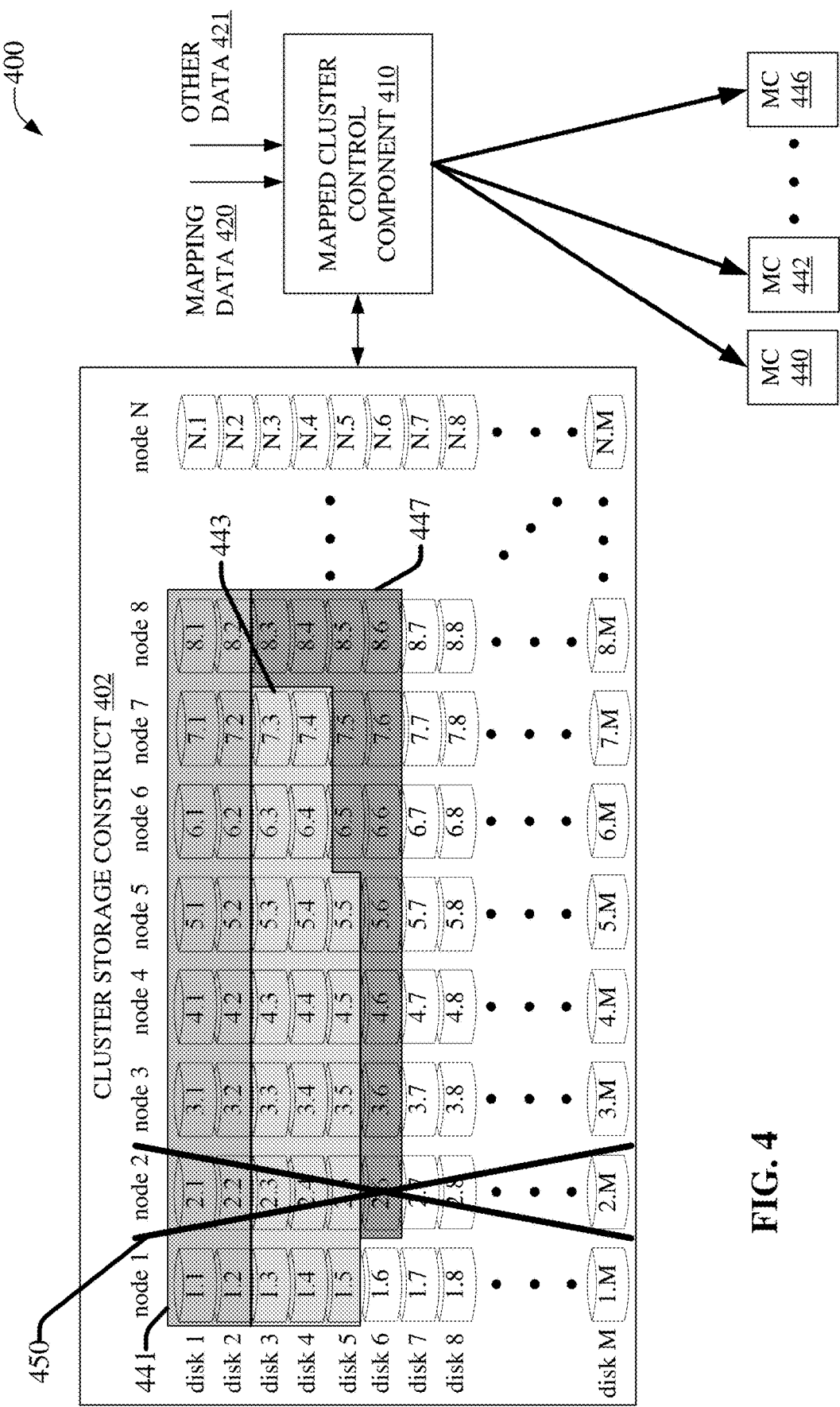
FIG. 4 is an illustration of an example system having a first level of robustness resulting from a first distributed storage scheme for logical data in a real storage system employing affinity sensitive data storage distribution of logical data across real storage devices, in accordance with aspects of the subject disclosure.

FIG. 4 is an illustration of example system 400 having a first level of robustness resulting from a first distributed storage scheme for logical data in a real storage system employing affinity sensitive data storage distribution of logical data across real storage devices, in accordance with aspects of the subject disclosure. System 400 can comprise mapped cluster control component 410. Mapped cluster control component 410 can receive mapping data 420, other data 421, etc., and can facilitate interaction with mapped clusters, e.g., MC 440-446, etc., e.g., creating, deleting, freeing, releasing, adapting, altering, etc. In an aspect, other data 421 that can be, for example, a mapping rule(s), a mapping scheme, a real disk/real node/real cluster selection criterion, affinity matrix, affinity value, affinity plot, affinity matrix rank, affinity matrix score, mapping scheme rank, mapping scheme score, etc. In an aspect, mapped cluster component 410 can interact with mapped clusters based on mapping data 420, other data 421, etc. A mapped cluster, e.g., MC 420-446, etc., can be a logical storage cluster built on top of a real cluster(s), e.g., cluster storage construct 402, e.g., MC 440 can be a logical representation of data stored in portion 441, MC 442 can be a logical representation of data stored in portion 443, MC 446 can be a logical representation of data stored in portion 447, etc.

In an aspect, mapped disks and mapped nodes of a mapped cluster can map to nearly any constellation of real storage locations, e.g., real disks, real nodes, real clusters, or portions thereof, etc. As an example, MC 440 can be a 2×8 mapped cluster mapping to portion 441 of cluster storage construct 402, e.g., an 8×2 portion of an N×M real cluster. As a second example, MC 442 can map to portion 443 of cluster storage construct 402. As a third example, MC 446 can map to portion 447 of cluster storage construct 402. Alternative mappings are possible, for example, where MC 540-546 are the same as MC 440-446, they can alternatively map to portions 541-547 respectively, which is a different mapping than to portions 441-447 respectively.

Figure 5:
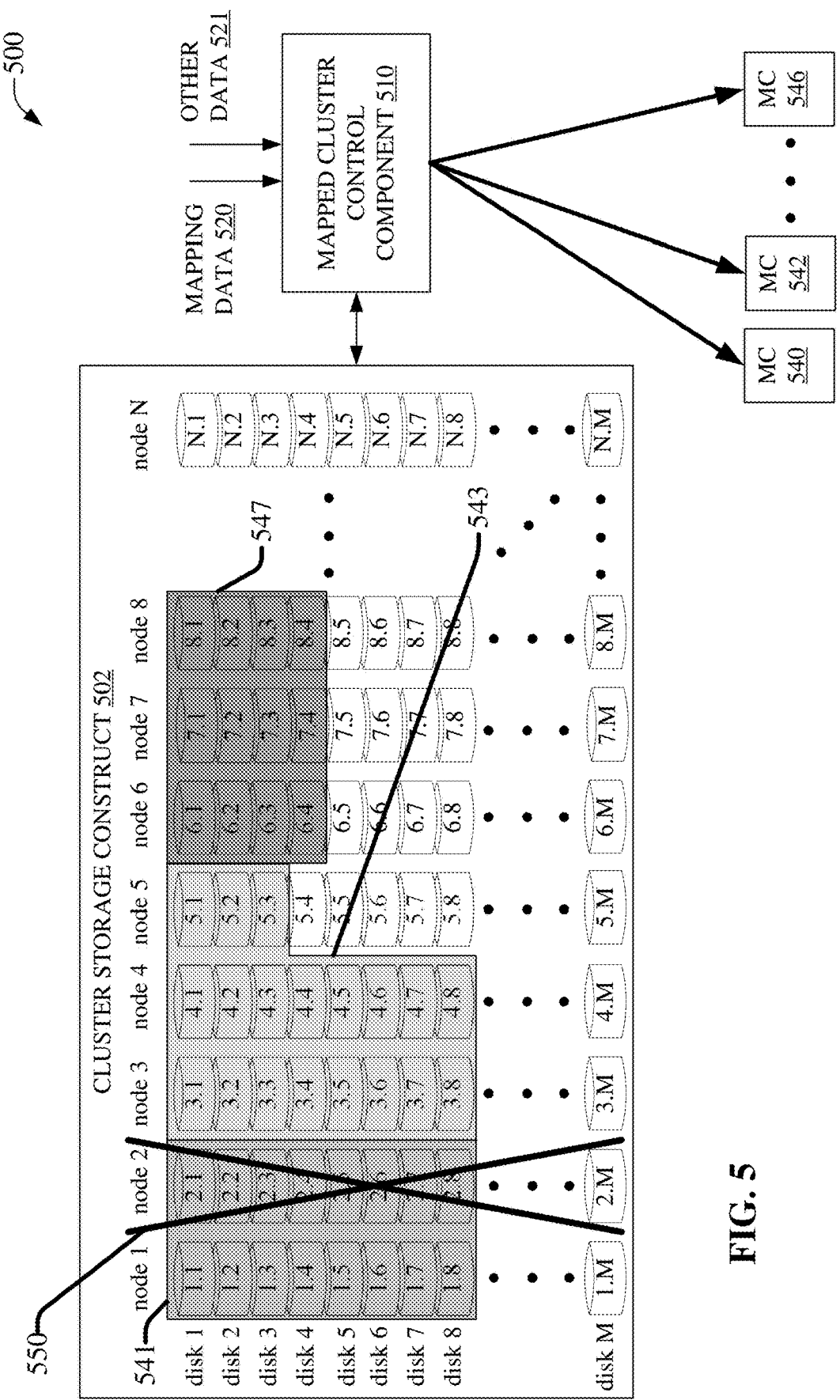
FIG. 5 is an illustration of an example system having a second level of robustness resulting from a first distributed storage scheme for logical data in a real storage system employing affinity sensitive data storage distribution of logical data across real storage devices, in accordance with aspects of the subject disclosure.

In an aspect, while a nearly arbitrary mapping of a mapped cluster into a real cluster can provide flexibility, granularity, and dynamic adaptation of a mapped cluster, it can be desirable to determine, rank, select, etc., mappings that can provide high accessibility to data stored via a mapped cluster. High accessibility can relate to data remaining accessible in during a period in which some portion of a real cluster(s) becomes less accessible, e.g., a real node fails/reboots/etc., a network connection to a real node becomes sluggish, fails, etc., or nearly any other cause of accessing data stored in a real storage location and mapped to a mapped cluster becoming less accessible, not accessible, etc., for example node 2 of cluster storage construct 402 can become less accessible, as indicated by strikethrough 450. As an example, where MC 440 is mapped to portion 441, in FIG. 4, a processing error can cause node 2 of cluster storage construct 402 to reboot, which can reduce access to data stored in real disk 2.1 and real disk 2.2 for interactions via MC 440. Additionally, in this example, the lowered access to node 2 of cluster storage construct 402 can also reduce access to data stored on other real disks mapped to other MCs, e.g., real disks 2.3-2.5 of portion 443 can be less accessible via corresponding MC 442, real disk 2.6 of portion 447 can be less accessible via corresponding MC 446, etc. However, FIG. 4 presents an example of higher accessibility than is illustrated in FIG. 5, because even though access to data stored in real disk 2.1 and 2.2 for MC 440 is reduced by the example reboot of node 2, data stored in nodes 1 and 3-8 of cluster storage construct 402, can remain accessible, e.g., nodes 1 and 3-8 of portion 441 can provide access to at least a portion of data stored according MC 440. In some embodiments, for example where an MC stores data with redundancy to protect against the loss of a mapped node and where the storage is performed according to a corresponding data loss protection rule, loss of node 2 at 450 can result in no loss to data access because redundant data can be stored in one or more of real nodes 1 and 3-8. System 400 can illustrate higher affinity and flatter affinity than is illustrated by system 500 of FIG. 5, because the stored data corresponding to a single mapped cluster is spread across more nodes of the real cluster in system 400 than in system 500.

In an aspect, the higher affinity and flatter affinity matrix of system 400, in contrast to system 500, can provide a higher availability that can also improve data recovery processes, e.g., faster, more widely distributed computer resource loading, etc., as has been disclosed herein. As an example, loss of node 2 at 450 can result in each of the remaining real nodes shouldering a portion of the computer resource burden to recover the data stored on the lost real node, for example, 1⁄7th of the burden, etc. It will be noted that placing a lower burden on the computer resources of a real node for recovery of a less accessible node can further allow the real node to allocate more of the computer resources to other computing tasks, e.g., enabling access to data for other mapped nodes that have corresponding data mapped to the real node.

FIG. 5 is an illustration of example system 500 having a second level of robustness resulting from a first distributed storage scheme for logical data in a real storage system employing affinity sensitive data storage distribution of logical data across real storage devices, in accordance with aspects of the subject disclosure. System 500 can comprise mapped cluster control component 510. Mapped cluster control component 510 can receive mapping data 520, other data 521, etc., and can facilitate interaction with mapped clusters, e.g., MC 540-546, etc., e.g., creating, deleting, freeing, releasing, adapting, altering, etc. In an aspect, other data 521 that can be, for example, a mapping rule(s), a mapping scheme, a real disk/real node/real cluster selection criterion, affinity matrix, affinity value, affinity plot, affinity matrix rank, affinity matrix score, mapping scheme rank, mapping scheme score, etc. In an aspect, mapped cluster component 510 can interact with mapped clusters based on mapping data 520, other data 521, etc. A mapped cluster, e.g., MC 520-546, etc., can be a logical storage cluster built on top of a real cluster(s), e.g., cluster storage construct 502, e.g., MC 540 can be a logical representation of data stored in portion 541, MC 542 can be a logical representation of data stored in portion 543, MC 546 can be a logical representation of data stored in portion 547, etc.

In an aspect, mapped disks and mapped nodes of a mapped cluster can map to nearly any constellation of real storage locations, e.g., real disks, real nodes, real clusters, or portions thereof, etc. As an example, MC 540 can be a 2×8 mapped cluster mapping to portion 541 of cluster storage construct 502, e.g., an 2×8 portion of an N×M real cluster. As a second example, MC 542 can map to portion 543 of cluster storage construct 502. As a third example, MC 546 can map to portion 547 of cluster storage construct 502. Alternative mappings are possible, for example, where MC

540-546 are the same as MC 440-446, they can alternatively map to portions 441-447 respectively, which is a different mapping than to portions 541-547 respectively.

In an aspect, while a nearly arbitrary mapping of a mapped cluster into a real cluster can provide flexibility, granularity, and dynamic adaptation of a mapped cluster, it can be desirable to determine, rank, select, etc., mappings that can provide high accessibility to data stored via a mapped cluster. High accessibility can relate to data remaining accessible in during a period in which some portion of a real cluster(s) becomes less accessible, e.g., a real node fails/reboots/etc., a network connection to a real node becomes sluggish, fails, etc., or nearly any other cause of accessing data stored in a real storage location and mapped to a mapped cluster becoming less accessible, not accessible, etc., for example node 2 of cluster storage construct 502 can become less accessible, as indicated by strikethrough 550. As an example, where MC 540 is mapped to portion 541, in FIG. 4, a processing error can cause node 2 of cluster storage construct 502 to reboot, which can reduce access to data stored in real disks 2.1 through 2.8 for interactions via MC 540. Additionally, in this example, the lowered access to node 2 of cluster storage construct 502 can also reduce access to data stored on other real disks mapped to other MCs, e.g., real disks 2.9-2.M of node 2 can be less accessible via corresponding other MCs, not illustrated. FIG. 5 presents an example of lower accessibility than is illustrated in FIG. 4, because data stored in real disks 2.1 through and 2.8 for MC 540 is reduced by the example reboot of node 2, causing only data in real disks 1.1 through 1.8 to be accessible, e.g., ½ of the real disk storage can be compromised in the illustrated lowered access to node 2 at 550. System 500 can illustrate lower affinity that can have higher variance in the affinity score of an affinity matrix than is illustrated by system 400 of FIG. 4, because the stored data corresponding to a single mapped cluster is not spread across more nodes of the real cluster in system 500 than in system 400.

In an aspect, the lower affinity and higher distribution of affinity scores of an affinity matrix for system 500, in contrast to system 400, can provide a lower availability of data that can also comparatively hinder a data recovery processes, e.g., data recovery in system 500 can be slower and more heavily burden fewer computer resources than would be in system 400, as has been disclosed herein. As an example, loss of node 2 at 550 can result in the entire computer resource burden to recover the data stored on the lost real node being placed on the computer resources of node 1. It will be noted that placing a higher burden on the computer resources of a real node for recovery of a less accessible node can reduce the computer resources available at the real node for other computing tasks, e.g., enabling access to data for other mapped nodes that have corresponding data mapped to the real node, e.g., other MCs having data stored on node 1 can experience lowered access to data because, for example, the processor(s) of node 1 are so heavily burdened with rebuilding the lost data of node 2 that there can be less available computer resources to manage the data access in node 1 for other corresponding MCs.

Figure 6:
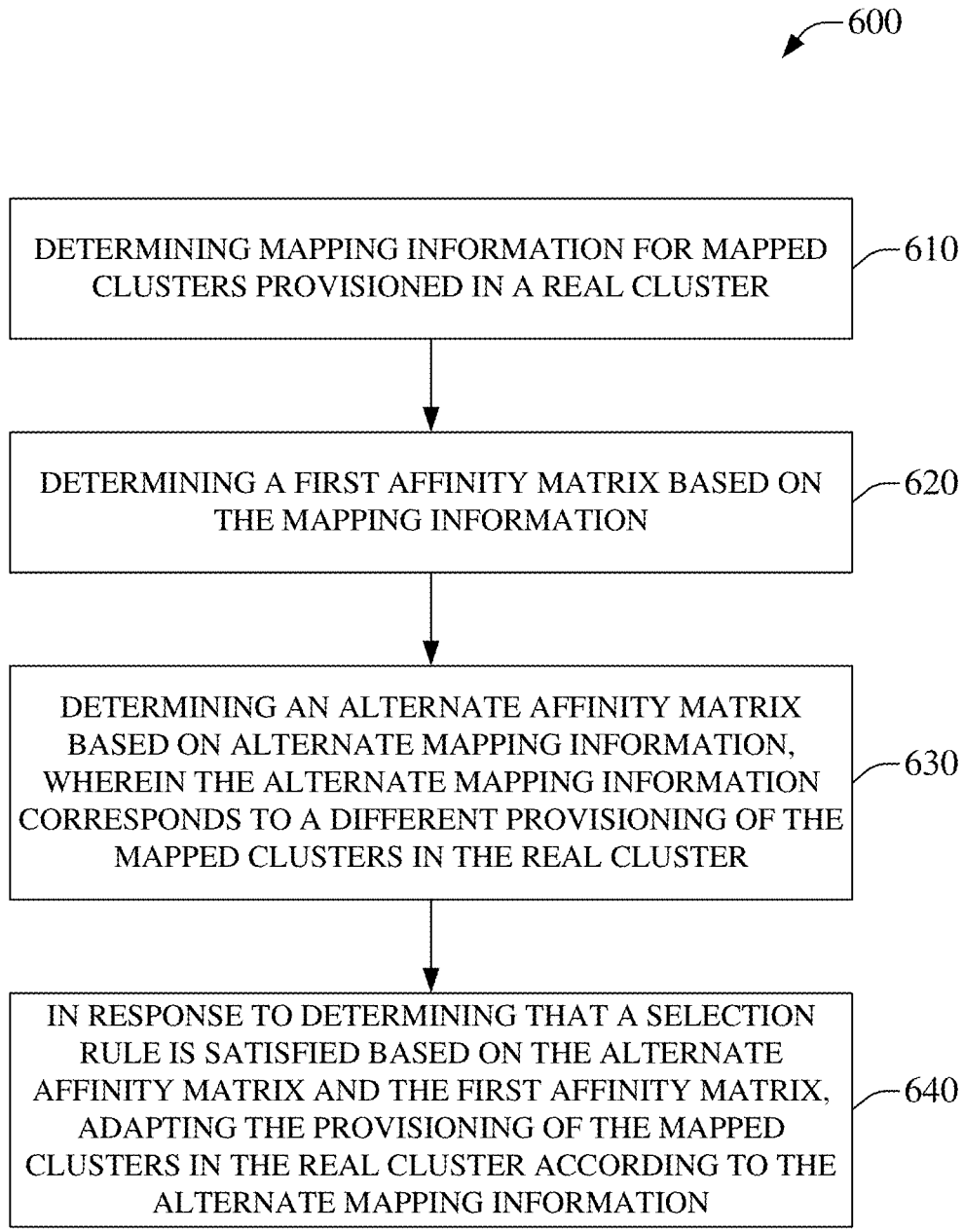
FIG. 6 is an illustration of an example method facilitating affinity sensitive data storage distribution of logical data across real storage devices, in accordance with aspects of the subject disclosure.
Figure 7:
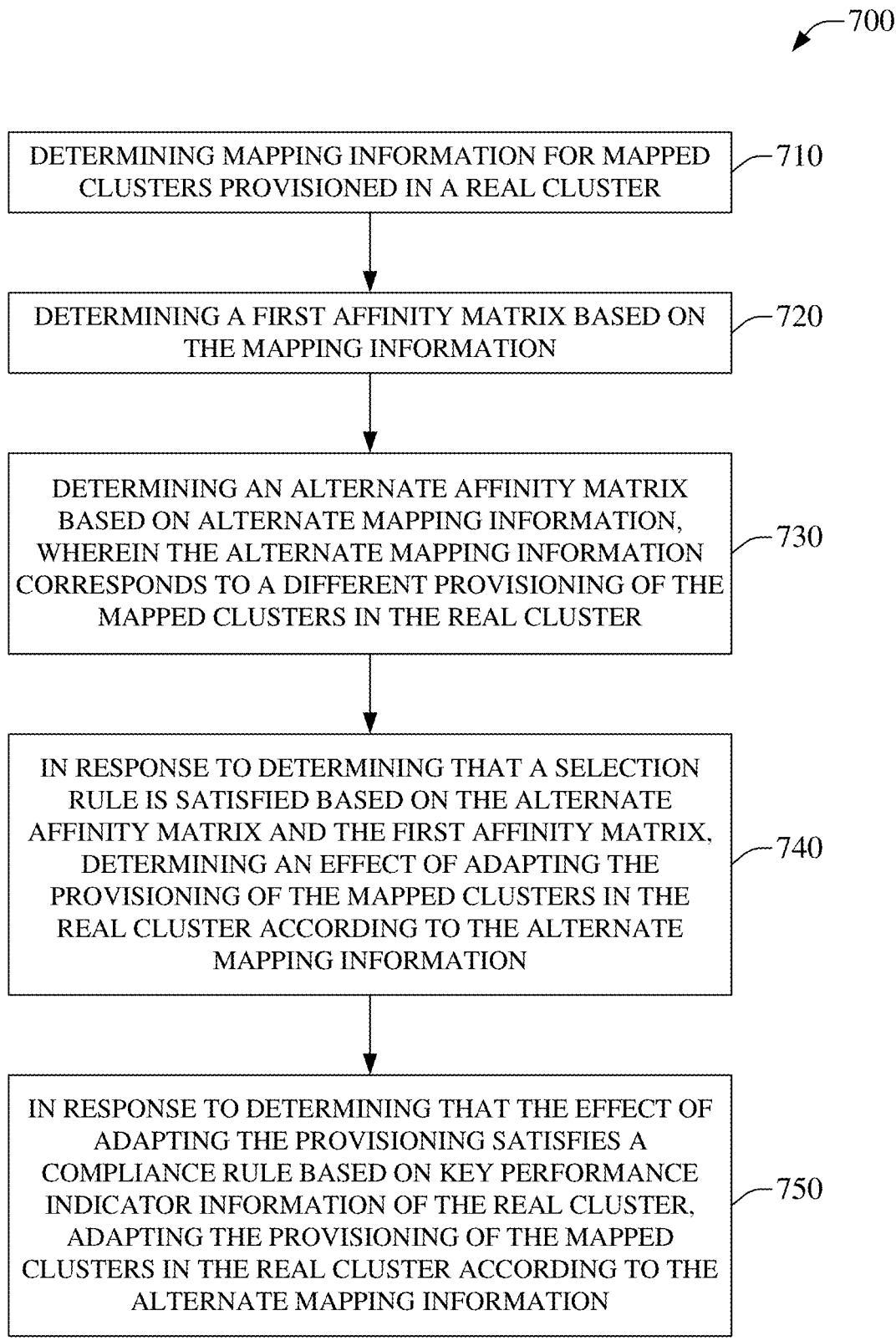
FIG. 7 is an illustration of an example method facilitating affinity sensitive data storage distribution of logical data across real storage devices wherein a distributed storage scheme can be selected based on a corresponding level of robustness, in accordance with aspects of the subject disclosure.
Figure 8:
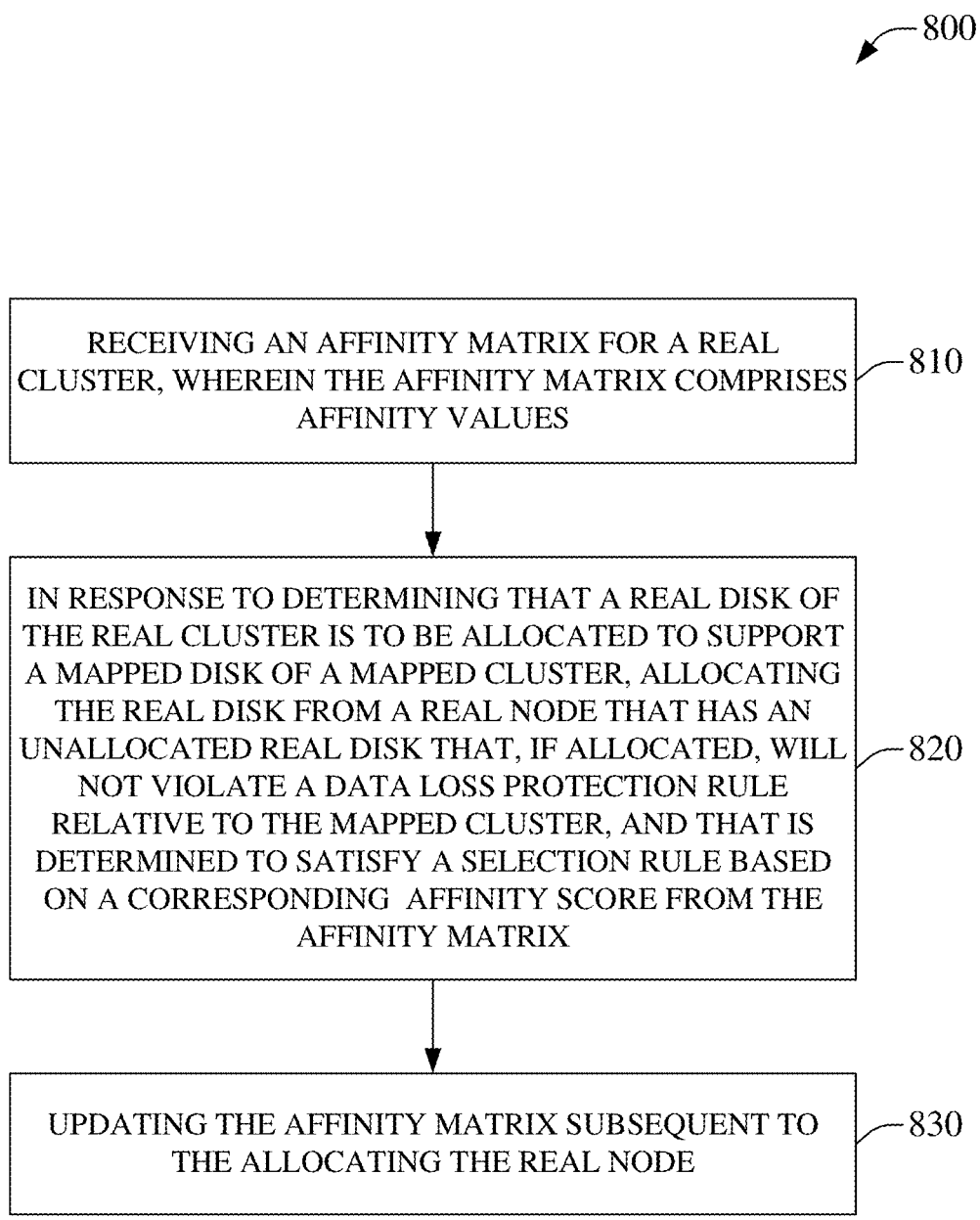
FIG. 8 illustrates an example method enabling affinity sensitive data storage distribution of logical data across real storage devices according to an example distributed storage scheme, in accordance with aspects of the subject disclosure.

In view of the example system(s) described above, example method(s) that can be implemented in accordance with the disclosed subject matter can be better appreciated with reference to flowcharts in FIG. 6-FIG. 8. For purposes of simplicity of explanation, example methods disclosed herein are presented and described as a series of acts; however, it is to be understood and appreciated that the claimed subject matter is not limited by the order of acts, as some acts may occur in different orders and/or concurrently with other acts from that shown and described herein. For example, one or more example methods disclosed herein could alternatively be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a described example method in accordance with the subject specification. Further yet, two or more of the disclosed example methods can be implemented in combination with each other, to accomplish one or more aspects herein described. It should be further appreciated that the example methods disclosed throughout the subject specification are capable of being stored on an article of manufacture (e.g., a computer-readable medium) to allow transporting and transferring such methods to computers for execution, and thus implementation, by a processor or for storage in a memory.

FIG. 6 is an illustration of an example method 600 that can facilitate affinity sensitive data storage distribution of logical data across real storage devices, in accordance with aspects of the subject disclosure. Method 600, at 610, can comprise determining mapping information for mapped clusters provisioned in a real cluster. Mapped disks and mapped nodes of a mapped cluster can map to nearly any constellation of real storage locations, e.g., real disks of real nodes of real clusters, or portions thereof, etc. The mapping information can indicate which portions of a real cluster are provisioned in support of one or more mapped disks of one or more mapped nodes of one or more mapped clusters.

At 620, method 600 can comprise determining a first affinity matrix based on the mapping information. An affinity between real nodes can be based on a count of real disks participating in a mapped cluster. A higher affinity score can indicate that a real node comprises real disks participating in more mapped clusters than a real node with a lower affinity score, e.g., the real node can increase an affinity score by having disks participating in more mapped nodes and thereby having an affinity with more other real nodes. An affinity matrix can be an N×N matrix, where N is a count of real nodes of the real cluster, having values in a third dimension reflecting a determined level of affinity. A value $X(i,j)$ in an affinity matrix can indicate a number of disks an $i^{th}$ real node and $j^{th}$ real node donate to a same mapped cluster. It will be noted that $X(i,i)=0$, and further noted that $X(i,j)=X(j,i)$. It is noted that the greater the level of similarity in affinity values across an affinity matrix, typically the more robust the storage scheme is against a real node becoming less accessible, e.g., when values $X(i,j|i!)=j$ are more similar the storage scheme is generally more robust than when the values are less similar. This can result in stored data being more accessible, that is, more data can be accessed even in the event of a real node becoming less accessible. Further, recovery of data from a less accessible real node is also improved, as previously discussed, when the affinity values are more similar in contrast to the affinity values being less similar.

At 630, an alternate affinity matrix can be determined based on alternate mapping information. In an aspect, alternate mapping information can be based on a perturbation of the mapping information at 610. As such, the alternate mapping information can correspond to a different provisioning of the mapped clusters in the real cluster. In an embodiment, other mappings can be determined and corresponding alternate affinity matrixes can be determined. This can aid in selecting a preferred affinity matrix, for example, an affinity matrix that has high affinity scores and low is flat/balanced, e.g., there can be low deviation between affinity scores in a selected alternate affinity matrix. Whereas a selected alternate affinity matrix corresponds to an alternate mapping, the alternate mapping can be used to alter the provisioning of real disks supporting corresponding mapped clusters in a manner than can improve the accessibility of stored data.

At 640, method 600 can comprise determining that a selection rule based on the alternate affinity matrix and the first affinity matrix is satisfied and, as a result, adapting the provisioning of the mapped clusters in the real cluster in accord with the alternate mapping information that corresponds to the alternate affinity matrix. At this point method 600 can end. In an example, where the alternate affinity matrix has better affinity scores, less deviation between affinity scores, etc., in comparison to the first affinity matrix, then the alternate affinity matrix can represent an improvement to the storage of data and the provisioning of real disks supporting mapped clusters can be, accordingly, adapted. This can result in storing data of a mapped cluster in the real cluster in a manner that allows the stored data to have higher accessibility, more robustness against loss of a real node, improved recovery from a real node becoming less accessible, etc.

FIG. 7 is an illustration of an example method 700, facilitating affinity sensitive data storage distribution of logical data across real storage devices wherein a distributed storage scheme can be selected based on a corresponding level of robustness, in accordance with aspects of the subject disclosure. At 710, method 700 can comprise determining mapping information for mapped clusters provisioned in a real cluster. Mapped disks and mapped nodes of a mapped cluster can map to nearly any constellation of real storage locations, e.g., real disks of real nodes of real clusters, or portions thereof, etc. The mapping information can indicate which portions of a real cluster are provisioned in support of one or more mapped disks of one or more mapped nodes of one or more mapped clusters.

At 720, method 700 can comprise determining a first affinity matrix based on the mapping information. An affinity between real nodes can be based on a count of real disks participating in a mapped cluster. A higher affinity score can indicate that a real node comprises real disks participating in more mapped clusters than a real node with a lower affinity score, e.g., the real node can increase an affinity score by having disks participating in more mapped nodes and thereby having an affinity with more other real nodes. An affinity matrix can be an N×N matrix, where N is a count of real nodes of the real cluster, having values in a third dimension reflecting a determined level of affinity. A value $X(i,j)$ in an affinity matrix can indicate a number of disks an $i^{th}$ real node and jth real node donate to a same mapped cluster. It will be noted that $X(i,i)=0$, and further noted that $X(i,j)=X(j,i)$. It is noted that the greater the level of similarity in affinity values across an affinity matrix, typically the more robust the storage scheme is against a real node becoming less accessible, e.g., when values $X(i,j|i!=j$ are more similar the storage scheme is generally more robust than when the values are less similar. This can result in stored data being more accessible, that is, more data can be accessed even in the event of a real node becoming less accessible. Further, recovery of data from a less accessible real node is also improved, as previously discussed, when the affinity values are more similar in contrast to the affinity values being less similar.

At 730, an alternate affinity matrix can be determined based on alternate mapping information. The alternate mapping information can correspond to a prospectively different provisioning of the mapped clusters in the real cluster. In an embodiment, other potential mappings can be determined and corresponding alternate affinity matrixes can be determined. This can aid in selecting a preferred affinity matrix.

Method 700, at 740, can comprise determining that a selection rule based on the alternate affinity matrix and the first affinity matrix is satisfied, and in response, can determine an effect of adapting the provisioning of the mapped cluster in the real cluster according to the alternate mapping information. In an aspect, rather than simply implementing an alternate provisioning based on the affinity, method 700 can further determine if implementing the alternate provisioning can result in other effects. These expected effects can then be reviewed prior to adapting the provisioning. This can forestall negative effects that can result from adapting the provisioning based on an improved affinity.

At 750, method 700, can comprise adapting the provisioning of the mapped clusters in the real cluster in accord with the alternate mapping information that corresponds to the alternate affinity matrix in response to determining that the effect determined at 740 satisfies a compliance rule. The compliance rule can be based on key performance indicator (s) (KPIs) of the real cluster. As an example, where the effect at 740 is assigning a real disk from an older real node to support the mapped cluster, then the KPIs of the older real cluster can be used to determine if the compliance rule is satisfied. In this example, if the older real node KPIs indicate that the node has sufficiently fast processor(s), then the compliance rule can be satisfied. As a second example, if the older real node KPIs indicate that the node becomes less accessible sufficiently frequently, then the compliance rule may not be satisfied. As a third example, where the older real node KPIs indicate that the node is not rated for high security data, then the compliance rule may not be satisfied where a customer agreement indicates that data must be stored on devices rated for high security data. Numerous other examples are readily appreciated and fall within the scope of the present disclosure even where note explicitly recited for the sake of clarity and brevity.

Where the compliance rule is determined to be satisfied at 750, method 700 can comprise adapting the provisioning of the mapped clusters in the real cluster according to the alternate mapping information. At this point method 700 can end. This can result in storing data of a mapped cluster in the real cluster in a manner that allows the stored data to have higher accessibility, more robustness against loss of a real node, improved recovery from a real node becoming less accessible, etc. Moreover, the effects of the alternate provisioning can also have been determined to satisfy the compliance rule.

FIG. 8 is an illustration of an example method 800, which can enable affinity sensitive data storage distribution of logical data across real storage devices according to an example distributed storage scheme, in accordance with aspects of the subject disclosure. At 810, method 800 can comprise receiving an affinity matrix for a real cluster, wherein the affinity matrix comprises affinity values. An affinity between real nodes can be based on a count of real disks participating in a mapped cluster. A higher affinity score can indicate that a real node comprises real disks participating in more mapped clusters than a real node with a lower affinity score, e.g., the real node can increase an affinity score by having disks participating in more mapped nodes and thereby having an affinity with more other real nodes. An affinity matrix can be an N×N matrix, where N is a count of real nodes of the real cluster, having values in a third dimension reflecting a determined level of affinity. A value X(i,j) in an affinity matrix can indicate a number of disks an $i^{th}$ real node and jth real node donate to a same mapped cluster. It will be noted that X(i,i)=0, and further noted that X(i,j)=X(j,i). It is noted that the greater the level of similarity in affinity values across an affinity matrix, typically the more robust the storage scheme is against a real node becoming less accessible, e.g., when values X(i,j|i!)=j are more similar the storage scheme is generally more robust than when the values are less similar. This can result in stored data being more accessible, that is, more data can be accessed even in the event of a real node becoming less accessible. Further, recovery of data from a less accessible real node is also improved, as previously discussed, when the affinity values are more similar in contrast to the affinity values being less similar.

At 820, method 800 can comprise, in response to determining that a real disk of the real cluster is to be allocated to support a mapped disk of a mapped cluster, allocating a real disk from a real node. The real disk is selected from a real node that has an unallocated real disk. Moreover, the allocation of the real disk should not violate a data loss prevention rule. Further, the real disk is selected based on the real disk satisfying a selection rule based on a corresponding affinity score from the affinity matrix. A typical example of a data loss prevention rule can be to prohibit two real disks of one real node being mapped to two different mapped nodes of one mapped cluster. This type of data loss prevention rule can reduce potential data loss events, for example, where a single mapped cluster that comprises two mapped nodes that each use real disks of the same real node, then if the real node fails, a data loss event can occur because a data redundancy scheme of the mapped cluster can be insufficient to manage the loss of mapped disks in multiple mapped nodes of the mapped cluster where they correspond to multiple real disks in the same real node of a real cluster if that real node becomes less accessible.

Method 800, at 830, can comprise updating the affinity matrix subsequent to the allocation of the real node from 820. At this point method 800 can end. In an aspect, the allocation can based on the selection of the real disk based on an affinity score of from the affinity matrix at 810. Upon allocation, the affinity matrix can correspondingly change and therefore is updated at 830. As such, subsequent real disk allocation would employ the updated affinity matrix. It can be expected that upon each real disk allocation during provisioning one or more mapped clusters to the real cluster, the affinity matrix will be updated. Accordingly, method 800 can be a technique to allocate real disks based on the immediately preceding affinity matrix scores in an incremental fashion. This can effectively provision mapped clusters to a real cluster.

Where method 800 is employed with multiple mapped clusters, each mapped cluster can be provisioned prior to indexing to a next mapped cluster, e.g., allocate real disks for a first mapped cluster before moving on to allocate real disks for a next mapped cluster. Further, for each mapped cluster being provisioned, allocation of real disks can, for example, proceed according to mapped disks, e.g., a first disk of each mapped node of a first mapped cluster can be allocated before a moving on to allocation of second disks of each mapped node of the first mapped cluster. As an example, in a 4×2 mapped cluster, allocation of mapped disks to real disks can proceed according to the flowing order of mapped disks: 1.1m, 2.1m, 3.1m, 4.1m, 1.2m, 2.2m, 3.2m, 4.2m. Further, in this example, the first mapped cluster can be provisioned prior to provisioning of a second mapped cluster.

The provisioning according to method 800 can indicate failure in some circumstances. Failure can result, in an aspect, from a real disk not being available, e.g., all real disks of a real node have already been allocated. This failure mode can be overcome by selecting another real node that has unallocated real disks available. Failure can further result, in another aspect, where use of the real disk would result in violation of a data loss prevention rule, e.g., use of the initially selected disk would result in disks from two mapped nodes of a single mapped cluster being allocated in a single real node. This failure mode can be overcome by selecting an alternate real disk that would not violate the data loss prevention rule. A further failure mode can result from the real disk not satisfying the selection rule based on the affinity scores of the affinity matrix, e.g., the selected real disk is not in a node having a lowest affinity score, a threshold affinity score, etc. This failure mode can be overcome by selecting an alternate real node that does satisfy the selection rule.

Figure 9:
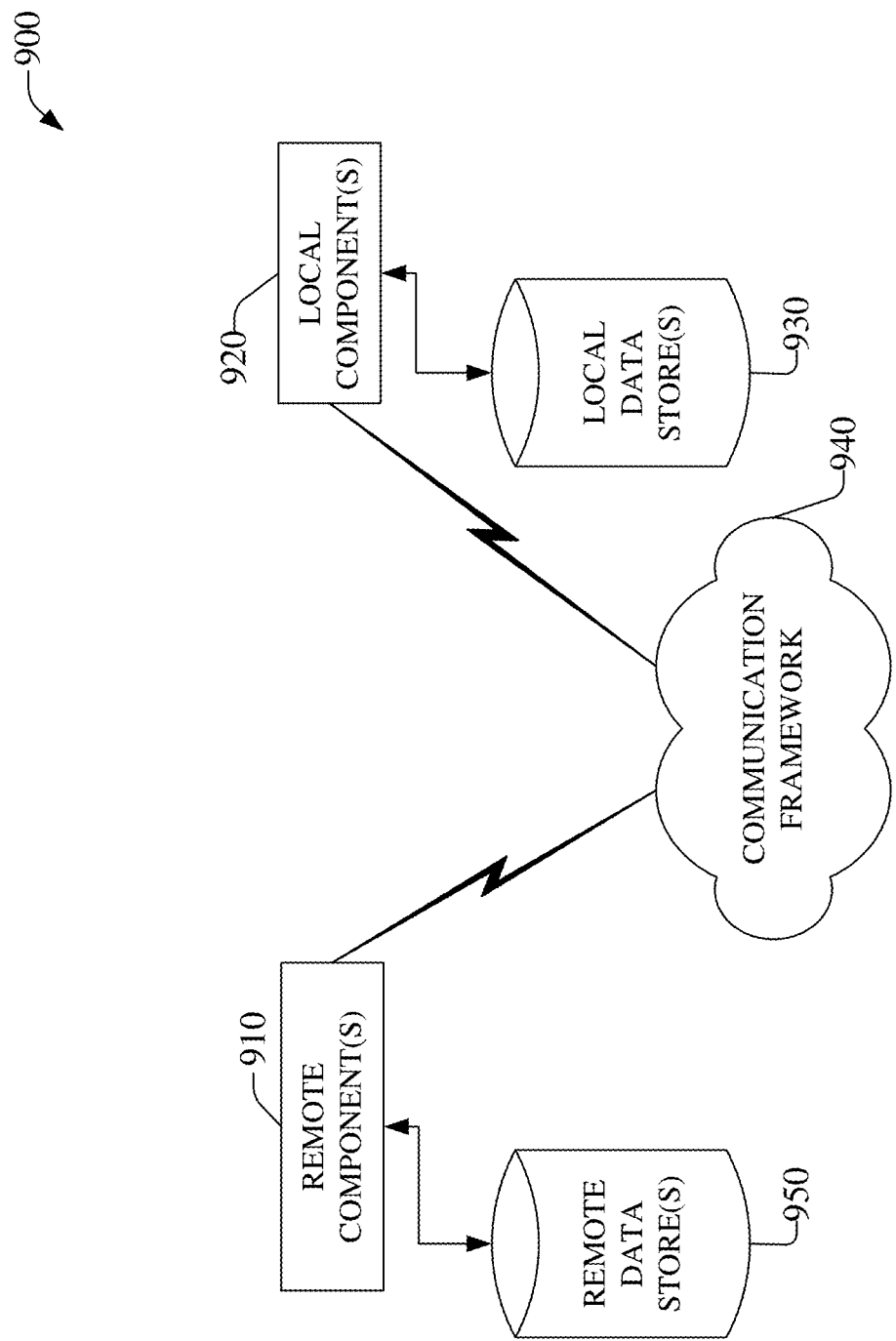
FIG. 9 depicts an example schematic block diagram of a computing environment with which the disclosed subject matter can interact.

FIG. 9 is a schematic block diagram of a computing environment 900 with which the disclosed subject matter can interact. The system 900 comprises one or more remote component(s) 910. The remote component(s) 910 can be hardware and/or software (e.g., threads, processes, computing devices). In some embodiments, remote component(s) 910 can be real nodes of a real cluster in communication with other real nodes of the real cluster that can be located in a different physical location. Communication framework 940 can comprise wired network devices, wireless network devices, mobile devices, wearable devices, radio access network devices, gateway devices, femtocell devices, servers, etc. In an aspect, a real cluster can be comprised of physically disparate devices, e.g., a real cluster can comprise devices in entirely different data centers, different cities, different states, different countries, etc. As an example, nodes 1-4 of cluster storage construct 102 can be located in Seattle Wash., while nodes 5-6 can be located in Boston Mass., and nodes 7-N can be located in Moscow Russia.

The system 900 also comprises one or more local component(s) 920. The local component(s) 920 can be hardware and/or software (e.g., threads, processes, computing devices). In some embodiments, local component(s) 920 can be real nodes of a real cluster in communication with other real nodes of the real cluster that can be located in a different physical location.

One possible communication between a remote component(s) 910 and a local component(s) 920 can be in the form of a data packet adapted to be transmitted between two or more computer processes. Another possible communication between a remote component(s) 910 and a local component(s) 920 can be in the form of circuit-switched data adapted to be transmitted between two or more computer processes in radio time slots. The system 900 comprises a communication framework 940 that can be employed to facilitate communications between the remote component(s) 910 and the local component(s) 920, and can comprise an air interface, e.g., Uu interface of a UMTS network, via a long-term evolution (LTE) network, etc. Remote component(s) 910 can be operably connected to one or more remote data store(s) 950, such as a hard drive, solid state drive, SIM card, device memory, etc., that can be employed to store information on the remote component(s) 910 side of communication framework 940. Similarly, local component(s) 920 can be operably connected to one or more local data store(s) 930, that can be employed to store information on the local component(s) 920 side of communication framework 940. As an example, remote and local real nodes can communicate KPIs, move stored data between local and remote real nodes, such as when a mapping of mapped clusters to a real cluster is updated based on affinity score, etc.

Figure 10:
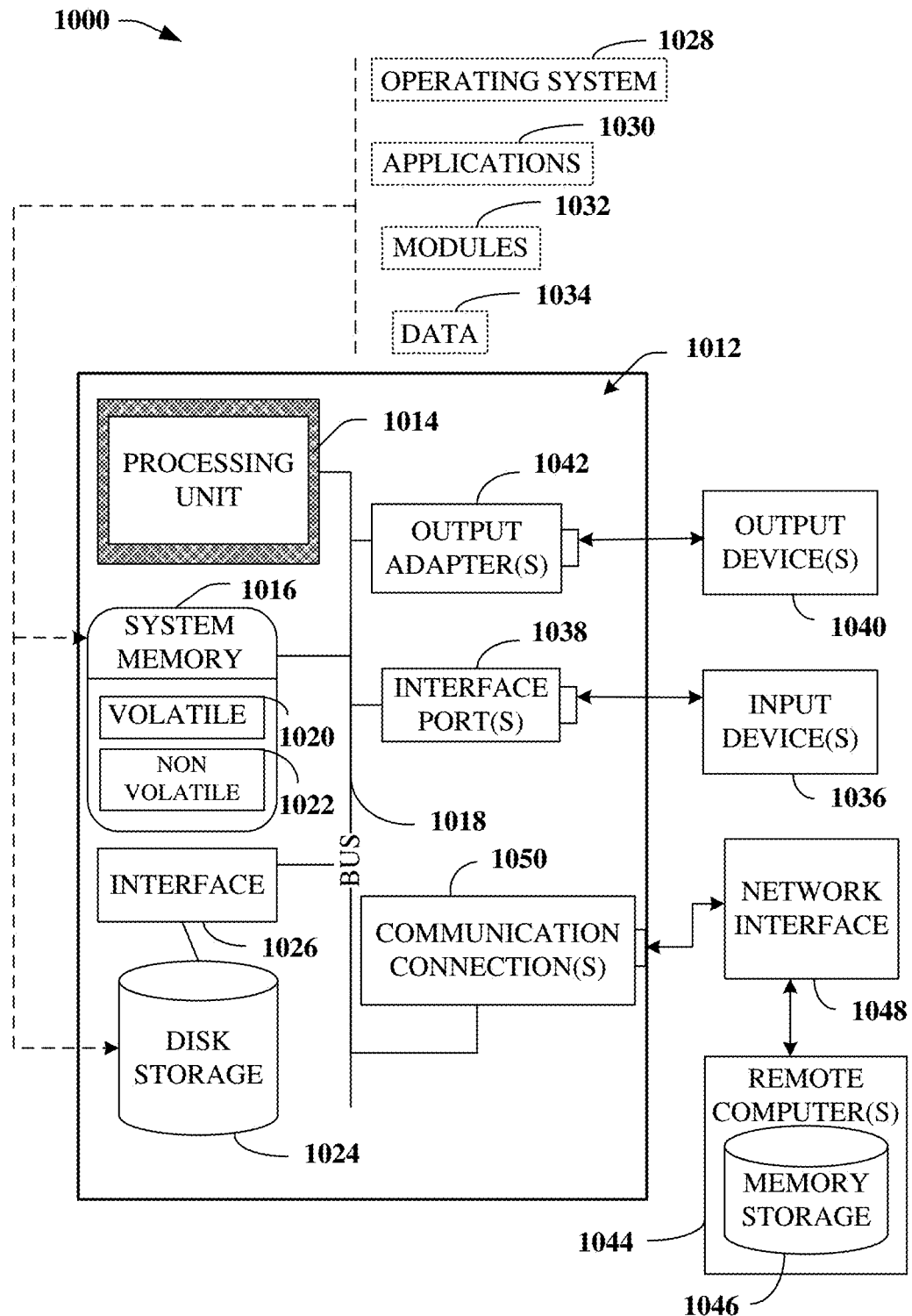
FIG. 10 illustrates an example block diagram of a computing system operable to execute the disclosed systems and methods in accordance with an embodiment.

In order to provide a context for the various aspects of the disclosed subject matter, FIG. 10, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that performs particular tasks and/or implement particular abstract data types.

In the subject specification, terms such as "store," "storage," "data store," data storage," "database," and substantially any other information storage component relevant to operation and functionality of a component, refer to "memory components," or entities embodied in a "memory" or components comprising the memory. It is noted that the memory components described herein can be either volatile memory or nonvolatile memory, or can comprise both volatile and nonvolatile memory, by way of illustration, and not limitation, volatile memory 1020 (see below), nonvolatile memory 1022 (see below), disk storage 1024 (see below), and memory storage 1046 (see below). Further, nonvolatile memory can be included in read only memory, programmable read only memory, electrically programmable read only memory, electrically erasable read only memory, or flash memory. Volatile memory can comprise random access memory, which acts as external cache memory. By way of illustration and not limitation, random access memory is available in many forms such as synchronous random access memory, dynamic random access memory, synchronous dynamic random access memory, double data rate synchronous dynamic random access memory, enhanced synchronous dynamic random access memory, SynchLink dynamic random access memory, and direct Rambus random access memory. Additionally, the disclosed memory components of systems or methods herein are intended to comprise, without being limited to comprising, these and any other suitable types of memory.

Moreover, it is noted that the disclosed subject matter can be practiced with other computer system configurations, comprising single-processor or multiprocessor computer systems, mini-computing devices, mainframe computers, as well as personal computers, hand-held computing devices (e.g., personal digital assistant, phone, watch, tablet computers, netbook computers, . . . ), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

FIG. 10 illustrates a block diagram of a computing system 1000 operable to execute the disclosed systems and methods in accordance with an embodiment. Computer 1012, which can be, for example, comprised in a cluster storage construct 102, 202, 402, 520, etc., e.g., in the nodes thereof, comprise in mapped cluster control component 110, 210, 310, 410, 510, etc., or comprised in other components disclosed herein, can comprise a processing unit 1014, a system memory 1016, and a system bus 1018. System bus 1018 couples system components comprising, but not limited to, system memory 1016 to processing unit 1014. Processing unit 1014 can be any of various available processors. Dual microprocessors and other multiprocessor architectures also can be employed as processing unit 1014.

System bus 1018 can be any of several types of bus structure(s) comprising a memory bus or a memory controller, a peripheral bus or an external bus, and/or a local bus using any variety of available bus architectures comprising, but not limited to, industrial standard architecture, microchannel architecture, extended industrial standard architecture, intelligent drive electronics, video electronics standards association local bus, peripheral component interconnect, card bus, universal serial bus, advanced graphics port, personal computer memory card international association bus, Firewire (Institute of Electrical and Electronics Engineers 1194), and small computer systems interface.

System memory 1016 can comprise volatile memory 1020 and nonvolatile memory 1022. A basic input/output system, containing routines to transfer information between elements within computer 1012, such as during start-up, can be stored in nonvolatile memory 1022. By way of illustration, and not limitation, nonvolatile memory 1022 can comprise read only memory, programmable read only memory, electrically programmable read only memory, electrically erasable read only memory, or flash memory. Volatile memory 1020 comprises read only memory, which acts as external cache memory. By way of illustration and not limitation, read only memory is available in many forms such as synchronous random access memory, dynamic read only memory, synchronous dynamic read only memory, double data rate synchronous dynamic read only memory, enhanced synchronous dynamic read only memory, SynchLink dynamic read only memory, Rambus direct read only memory, direct Rambus dynamic read only memory, and Rambus dynamic read only memory.

Computer 1012 can also comprise removable/non-removable, volatile/non-volatile computer storage media. FIG. 10 illustrates, for example, disk storage 1024. Disk storage 1024 comprises, but is not limited to, devices like a magnetic disk drive, floppy disk drive, tape drive, flash memory card, or memory stick. In addition, disk storage 1024 can comprise storage media separately or in combination with other storage media comprising, but not limited to, an optical disk drive such as a compact disk read only memory device, compact disk recordable drive, compact disk rewritable drive or a digital versatile disk read only memory. To facilitate connection of the disk storage devices 1024 to system bus 1018, a removable or non-removable interface is typically used, such as interface 1026.

Computing devices typically comprise a variety of media, which can comprise computer-readable storage media or communications media, which two terms are used herein differently from one another as follows.

Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can comprise, but are not limited to, read only memory, programmable read only memory, electrically programmable read only memory, electrically erasable read only memory, flash memory or other memory technology, compact disk read only memory, digital versatile disk or other optical disk storage, magnetic cassettes, magnetic tape, magnetic disk storage or other magnetic storage devices, or other tangible media which can be used to store desired information. In this regard, the term "tangible" herein as may be applied to storage, memory- or computer-readable media, is to be understood to exclude only propagating intangible signals per se as a modifier and does not relinquish coverage of all standard storage, memory or computer-readable media that are not only propagating intangible signals per se. In an aspect, tangible media can comprise non-transitory media wherein the term "non-transitory" herein as may be applied to storage, memory or computer-readable media, is to be understood to exclude only propagating transitory signals per se as a modifier and does not relinquish coverage of all standard storage, memory or computer-readable media that are not only propagating transitory signals per se. Computer-readable storage media can be accessed by one or more local or remote computing devices, e.g., via access requests, queries or other data retrieval protocols, for a variety of operations with respect to the information stored by the medium. As such, for example, a computer-readable medium can comprise executable instructions stored thereon that, in response to execution, can cause a system comprising a processor to perform operations, comprising receiving current affinity values, first predicted affinity values, and second predicted affinity values that can be employed in provisioning mapped disks to real disks, wherein the provisioning can be based on a mapping of corresponding mapped disks and real disks, and wherein the mapping can be selected according to the current, first predicted, and second predicted affinity values, etc., as is disclosed herein.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

It can be noted that FIG. 10 describes software that acts as an intermediary between users and computer resources described in suitable operating environment 1000. Such software comprises an operating system 1028. Operating system 1028, which can be stored on disk storage 1024, acts to control and allocate resources of computer system 1012. System applications 1030 take advantage of the management of resources by operating system 1028 through program modules 1032 and program data 1034 stored either in system memory 1016 or on disk storage 1024. It is to be noted that the disclosed subject matter can be implemented with various operating systems or combinations of operating systems.

A user can enter commands or information into computer 1012 through input device(s) 1036. In some embodiments, a user interface can allow entry of user preference information, etc., and can be embodied in a touch sensitive display panel, a mouse/pointer input to a graphical user interface (GUI), a command line controlled interface, etc., allowing a user to interact with computer 1012. Input devices 1036 comprise, but are not limited to, a pointing device such as a mouse, trackball, stylus, touch pad, keyboard, microphone, joystick, game pad, satellite dish, scanner, TV tuner card, digital camera, digital video camera, web camera, cell phone, smartphone, tablet computer, etc. These and other input devices connect to processing unit 1014 through system bus 1018 by way of interface port(s) 1038. Interface port(s) 1038 comprise, for example, a serial port, a parallel port, a game port, a universal serial bus, an infrared port, a Bluetooth port, an IP port, or a logical port associated with a wireless service, etc. Output device(s) 1040 use some of the same type of ports as input device(s) 1036.

Thus, for example, a universal serial busport can be used to provide input to computer 1012 and to output information from computer 1012 to an output device 1040. Output adapter 1042 is provided to illustrate that there are some output devices 1040 like monitors, speakers, and printers, among other output devices 1040, which use special adapters. Output adapters 1042 comprise, by way of illustration and not limitation, video and sound cards that provide means of connection between output device 1040 and system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. Remote computer(s) 1044 can be a personal computer, a server, a router, a network PC, cloud storage, a cloud service, code executing in a cloud-computing environment, a workstation, a microprocessor-based appliance, a peer device, or other common network node and the like, and typically comprises many or all of the elements described relative to computer 1012. A cloud computing environment, the cloud, or other similar terms can refer to computing that can share processing resources and data to one or more computer and/or other device(s) on an as needed basis to enable access to a shared pool of configurable computing resources that can be provisioned and released readily. Cloud computing and storage solutions can store and/or process data in third-party data centers which can leverage an economy of scale and can view accessing computing resources via a cloud service in a manner similar to a subscribing to an electric utility to access electrical energy, a telephone utility to access telephonic services, etc.

For purposes of brevity, only a memory storage device 1046 is illustrated with remote computer(s) 1044. Remote computer(s) 1044 is logically connected to computer 1012 through a network interface 1048 and then physically connected by way of communication connection 1050. Network interface 1048 encompasses wire and/or wireless communication networks such as local area networks and wide area networks. Local area network technologies comprise fiber distributed data interface, copper distributed data interface, Ethernet, Token Ring and the like. Wide area network technologies comprise, but are not limited to, point-to-point links, circuit-switching networks like integrated services digital networks and variations thereon, packet switching networks, and digital subscriber lines. As noted below, wireless technologies may be used in addition to or in place of the foregoing.

Communication connection(s) 1050 refer(s) to hardware/software employed to connect network interface 1048 to bus 1018. While communication connection 1050 is shown for illustrative clarity inside computer 1012, it can also be external to computer 1012. The hardware/software for connection to network interface 1048 can comprise, for example, internal and external technologies such as modems, comprising regular telephone grade modems, cable modems and digital subscriber line modems, integrated services digital network adapters, and Ethernet cards.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. Moreover, the use of any particular embodiment or example in the present disclosure should not be treated as exclusive of any other particular embodiment or example, unless expressly indicated as such, e.g., a first embodiment that has aspect A and a second embodiment that has aspect B does not preclude a third embodiment that has aspect A and aspect B. The use of granular examples and embodiments is intended to simplify understanding of certain features, aspects, etc., of the disclosed subject matter and is not intended to limit the disclosure to said granular instances of the disclosed subject matter or to illustrate that combinations of embodiments of the disclosed subject matter were not contemplated at the time of actual or constructive reduction to practice.

Further, the term "include" is intended to be employed as an open or inclusive term, rather than a closed or exclusive term. The term "include" can be substituted with the term "comprising" and is to be treated with similar scope, unless otherwise explicitly used otherwise. As an example, "a basket of fruit including an apple" is to be treated with the same breadth of scope as, "a basket of fruit comprising an apple."

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities, machine learning components, or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks comprise broadcast technologies (e.g., sub-Hertz, extremely low frequency, very low frequency, low frequency, medium frequency, high frequency, very high frequency, ultra-high frequency, super-high frequency, extremely high frequency, terahertz broadcasts, etc.); Ethernet; X.25; powerline-type networking, e.g., Powerline audio video Ethernet, etc.; femtocell technology; Wi-Fi; worldwide interoperability for microwave access; enhanced general packet radio service; second generation partnership project (2G or 2GPP); third generation partnership project (3G or 3GPP); fourth generation partnership project (4G or 4GPP); long term evolution (LTE); fifth generation partnership project (5G or 5GPP); third generation partnership project universal mobile telecommunications system; third generation partnership project 2; ultra mobile broadband; high speed packet access; high speed downlink packet access; high speed uplink packet access; enhanced data rates for global system for mobile communication evolution radio access network; universal mobile telecommunications system terrestrial radio access network; or long term evolution advanced. As an example, a millimeter wave broadcast technology can employ electromagnetic waves in the frequency spectrum from about 30 GHz to about 300 GHz. These millimeter waves can be generally situated between microwaves (from about 1 GHz to about 30 GHz) and infrared (IR) waves, and are sometimes referred to extremely high frequency (EHF). The wavelength (a) for millimeter waves is typically in the 1-mm to 10-mm range.

The term "infer" or "inference" can generally refer to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference, for example, can be employed to identify a specific context or action, or can generate a probability distribution over states of interest based on a consideration of data and events. Inference can also refer to techniques employed for composing higher-level events from a set of events and/or data. Such inference results in the construction of new events or actions from a set of observed events and/or stored event data, whether the events, in some instances, can be correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

What has been described above includes examples of systems and methods illustrative of the disclosed subject matter. It is, of course, not possible to describe every combination of components or methods herein. One of ordinary skill in the art may recognize that many further combinations and permutations of the claimed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A method, comprising:
   determining, by a system comprising a processor and a memory, current affinity values for a current affinity matrix corresponding to a first mapping of first mapped disks of mapped clusters to first real disks of a real cluster, wherein the current affinity values comprise an affinity value that corresponds to a count of mapped clusters mapped to the first real node;
   determining, by the system, first predicted affinity values for a first updated affinity matrix corresponding to a second mapping of second mapped disks of the mapped clusters to second real disks of the real cluster, wherein the second mapping is a different mapping than the first mapping; and
   in response to determining that a selection rule is satisfied based on the current affinity values and the first updated affinity values, allocating, by the system, the second real disks in accord with the second mapping.

2. The method of claim 1, further comprising:
   determining, by the system, second predicted affinity values for a second updated affinity matrix corresponding to a third mapping of third mapped disks of the mapped clusters to third real disks of the real cluster, wherein the third mapping is a different mapping than the second mapping; and
   in response to determining that the selection rule is satisfied based on the first predicted affinity values and the second predicted affinity values, allocating, by the system, the third real disks in accord with the third mapping.

3. The method of claim 1, wherein the allocating the second real disks in accord with the second mapping is further based on determining that the second mapping satisfies a compliance rule based on a key performance indicator of the real cluster.

4. The method of claim 3, wherein the key performance indicator indicates a level of computer resource performance.

5. The method of claim 1, further comprising,
   in response to determining that the selection rule is not satisfied based on the current affinity values and the first updated affinity values, determining, by the system, second predicted affinity values for a second updated affinity matrix corresponding to a third mapping of second mapped disks of the mapped clusters to third real disks of the real cluster, wherein the third mapping is a different mapping than either the first mapping or the second mapping; and
   in response to determining that the selection rule is satisfied based on the current affinity values and the second updated affinity values, allocating, by the system, the third real disks in accord with the third mapping.

6. A system, comprising:
   a processor; and
   a memory that stores executable instructions that, when executed by the processor, facilitate performance of operations, comprising:
      receiving first mapping data indicating a first allocation of a first real storage device comprised in a first real node comprised in a real storage cluster, wherein the first allocation of the first real storage device supports a first logical representation of a first mapped storage device comprised in a first mapped node of a first mapped storage cluster;
      determining a first affinity score of the first real node according to an affinity matrix of the real storage cluster, wherein the first affinity score corresponds to a count of mapped clusters that are supported by the first real node;
      allocating the first real storage device based on the first affinity score; and in response to the allocating the first real storage device, updating the affinity matrix, resulting in an updated affinity matrix.

7. The system of claim 6, wherein the operations further comprise:
receiving second mapping data indicating a second allocation of a second real storage device comprised in a second real node comprised in the real storage cluster, wherein the second allocation of the second real storage device supports a second logical representation of a second mapped storage device comprised in a second mapped node of a second mapped storage cluster;
determining a second affinity score of the second real node according to the updated affinity matrix of the real storage cluster;
allocating the second real storage device based on the second affinity score; and
in response to the allocating the second real storage device, updating the updated affinity matrix.

8. The system of claim 7, wherein the second mapped storage cluster is a same mapped storage cluster as the first mapped storage cluster.

9. The system of claim 7, wherein the second mapped node is a same mapped node as the first mapped node.

10. The system of claim 7, wherein the second real node is a same real node as the first real node.

11. The system of claim 6, wherein the allocating the first real storage device is further based on determining that a compliance rule is satisfied, and wherein the compliance rule is based on a key performance indicator of the real storage cluster.

12. The system of claim 11, wherein the key performance indicator is a processor speed of a processor of the first real node.

13. The system of claim 11, wherein the key performance indicator is an uptime value of the first real node.

14. The system of claim 6, wherein the allocating the first real storage device is based on a rank of the first affinity score among other affinity scores corresponding to other real nodes of the real storage cluster.

15. The system of claim 6, wherein the allocating the first real storage device is based on a level of similarity between affinity scores corresponding to real nodes of the real storage cluster, wherein the affinity scores comprise the first affinity score, and wherein the real nodes comprise the first real node.

16. The system of claim 6, wherein the first affinity score reflects a count of allocated real data storage devices of a real node, and wherein an allocated real data storage device is any real storage device having at least a portion thereof mapped to a mapped storage device.

17. A non-transitory machine-readable medium, comprising executable instructions that, when executed by a processor, facilitate performance of operations, comprising:
receiving current affinity values corresponding to a current mapping of first mapped disks of mapped clusters with first real disks of a real cluster, wherein the current affinity values comprise an affinity value that corresponds to a count of mapped clusters mapped to the first real node;
receiving first predicted affinity values corresponding to a first alternate mapping of second mapped disks of the mapped clusters with second real disks of the real cluster;
receiving second predicted affinity values corresponding to a second alternate mapping of third mapped disks of the mapped clusters with third real disks of the real cluster;
in response to determining that a selection rule is satisfied based on the current affinity values, the first predicted affinity values, and the second predicted affinity values, selecting a selected mapping, selected mapped disks corresponding to the selected mapping, and selected real disks corresponding to the selected mapping, wherein the selected mapping is selected from a group of mappings comprising the first alternate mapping and the second alternate mapping; and
provisioning the selected mapped disks by allocating the selected real disks in accord with the selected mapping.

18. The non-transitory machine-readable medium of claim 17, wherein, subsequent to the provisioning the selected mapped disks, the operations further comprise:
receiving updated current affinity values corresponding to a now current mapping of the selected mapped disks of the mapped clusters with the selected real disks of the real cluster;
receiving third predicted affinity values corresponding to a third alternate mapping of fourth mapped disks of the mapped clusters with fourth real disks of the real cluster;
receiving fourth predicted affinity values corresponding to a fourth alternate mapping of fifth mapped disks of the mapped clusters with fifth real disks of the real cluster;
in response to determining that the selection rule is satisfied based on the updated current affinity values, the third predicted affinity values, and the fourth predicted affinity values, selecting a next selected mapping, next selected mapped disks corresponding to the next selected mapping, and next selected real disks corresponding to the next selected mapping, wherein the next selected mapping is selected from another group of mappings comprising the third alternate mapping and the fourth alternate mapping; and
provisioning the next selected mapped disks by allocating the next selected real disks in accord with the next selected mapping.

19. The non-transitory machine-readable medium of claim 17, wherein the provisioning the selected mapped disks is further based on determining that the selected mapping satisfies a compliance rule based on a key performance indicator of the real cluster.

20. The non-transitory machine-readable medium of claim 17, wherein the provisioning the selected mapped disks is further based on determining that the selected mapping satisfies a data loss prevention rule prohibiting allocation of more than one real disk of one real node of the real cluster to more than one mapped node of a single mapped cluster of the mapped clusters.

* * * * *